US012253484B1

(12) United States Patent
Rickman et al.

(10) Patent No.: US 12,253,484 B1
(45) Date of Patent: Mar. 18, 2025

(54) LARGE FORMAT-FRACTIONAL THERMAL RUNAWAY CALORIMETER

(71) Applicant: United States of America as represented by the Administrator of NASA, Washington, DC (US)

(72) Inventors: Steven L. Rickman, Houston, TX (US); William Q. Walker, Houston, TX (US); John J. Darst, Houston, TX (US); Damien T. Calderon, Houston, TX (US); Richard A. Hagen, Houston, TX (US); Ryan P. Brown, Houston, TX (US); Gary A. Bayles, Crane, IN (US); Peter J. Hughes, Houston, TX (US); David Petrushenko, Houston, TX (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 820 days.

(21) Appl. No.: 17/451,643

(22) Filed: Oct. 20, 2021

Related U.S. Application Data

(63) Continuation-in-part of application No. 16/175,152, filed on Oct. 30, 2018, now Pat. No. 11,201,358.

(51) Int. Cl.
*G01K 17/00* (2006.01)
*G01N 25/20* (2006.01)
(Continued)

(52) U.S. Cl.
CPC ............ *G01N 25/20* (2013.01); *G01K 17/00* (2013.01); *G01N 25/50* (2013.01); *H01M 10/0525* (2013.01); *H01M 10/4285* (2013.01)

(58) Field of Classification Search
CPC .. G01N 25/20; G01N 25/486; G01N 25/4846; G01N 25/50; H01M 10/48;
(Continued)

(56) References Cited

U.S. PATENT DOCUMENTS

| 4,439,048 A | 3/1984 | Townsend et al. |
| 6,833,707 B1 | 12/2004 | Dahn et al. |

(Continued)

FOREIGN PATENT DOCUMENTS

| CN | 204203436 U | 3/2015 |
| CN | 103837834 B | 5/2016 |
| CN | 105588854 A | 5/2016 |
| KR | 100714153 B1 | 5/2007 |

OTHER PUBLICATIONS

William Q. Walker, NASA's Li-ion cell calorimeter technology webinar, T2 Portal, 2019 http://technology.nasa.gov/virtual-evet/nasa-li-ion-cell-calorimeter-technology-webinar.
(Continued)

*Primary Examiner* — Randy W Gibson
(74) *Attorney, Agent, or Firm* — Kurt G. Hammerle; Edward K. Fein

(57) ABSTRACT

A system for measuring a heat response of a battery cell includes a cell chamber configured to receive the battery cell therein. The cell chamber is configured to trigger a battery cell into a thermal runaway event while in the cell chamber, which causes the battery cell to eject an electrode winding, particles, and gas. The system also includes an ejecta bore muffler configured to receive the electrode winding, the particles, and the gas. The system also includes an ejecta basket configured to be positioned at least partially within the ejecta bore muffler. The ejecta basket is configured to capture the electrode winding while allowing at least a portion of the particles, the gas, or both to pass therethrough. The system also includes a gas collection system configured to receive at least a portion of the gas that passes through the ejecta basket.

20 Claims, 24 Drawing Sheets

(51) Int. Cl.
*G01N 25/50* (2006.01)
*H01M 10/0525* (2010.01)
*H01M 10/42* (2006.01)
*H01M 10/48* (2006.01)

(58) Field of Classification Search
CPC .......... H01M 10/4285; H01M 10/0525; G01K 17/00; Y02P 70/50; Y02E 60/10
See application file for complete search history.

(56) References Cited

U.S. PATENT DOCUMENTS

| | | | |
|---|---|---|---|
| 7,518,336 | B2 | 4/2009 | Sellers |
| 8,356,933 | B2 | 1/2013 | Pinhack |
| 8,926,172 | B2 | 1/2015 | Wu |
| 9,476,780 | B2 | 10/2016 | Keyser et al. |
| 9,490,507 | B2 | 11/2016 | Bandhauer et al. |
| 9,583,903 | B1 | 2/2017 | Miller et al. |
| 9,658,146 | B2 * | 5/2017 | Olson .................... G01N 30/88 |
| 11,201,358 | B1 * | 12/2021 | Dimpault-Darcy ......................... H01M 10/4285 |
| 2016/0341609 | A1 | 11/2016 | Ubelhor et al. |

OTHER PUBLICATIONS

Crafts, Chris C., et al. "Advanced technology development program for lithiumion batteries: thermal abuse performance of 18650 Li-ion cells." No. SAND2004-0584, Sandia Nation.

Ribiére, Perrine, et al "investigation on the fire-induced hazards of Li-ion battery cells by fire calorimetry." Energy & Environmental Science 5.1 (2012): 5271-5280.

Crafts, Chris C., Theodore T. Borek III, and Curtis Dale Mowry. "Safety testing of 18650-style Li-Ion cells." No. SAND2000-1454C. Sandia National Labs., Albuquerque, NM (US).

Doughty, Daniel Harvey. and Chris C. Crafts. "FreedomCAR: electrical energy storage system abuse test manual for electric and hybrid electric vehicle applications." No. SAND20.

Xuning Feng et al. "Thermal runaway features of large format prismatic lithium ion battery using extended volume accelerating rate calorimetry", Journal of Pwer Sources, vol. 255, pp. 294-301, 2014. (Year: 2014).

Hiroaki Ishikawa et al. "Study of thermal deterioration of lithium-ion secondary cell using an accelerated rate calorimeter (ARC) and AC impedance method", Journal of Power Sources, vol. 198. pp. 236-242, 2012.

Paul T. Coman et al. "A lumped model of venting during thermal runaway in a cylindrical Lithium Cobalt Oxide lithium-ion cell", Journal of Power Sources, vol. 307, pp. 56-62, 2016.

Donal P. Finegan et al. "Modelling and experiment to identify high-risk failure scenarios for testing the safety of lithium-ion cells", Journal of Power Sources, vol. 417, pp. 29-41, 2019.

William Q. Walker et al. "Decoupling of heat generated from ejected and non-ejected contents of 18650-format lithium-ion cells using statistical methods", Journal of Power Sources, vol. 415, pp. 207-218 2019.

William Q. Walker et al. "Enhancing Battery Safety with fractional thermal runaway calorimatry", The Battery Show Europe, pp. 1-25, 2019.

* cited by examiner

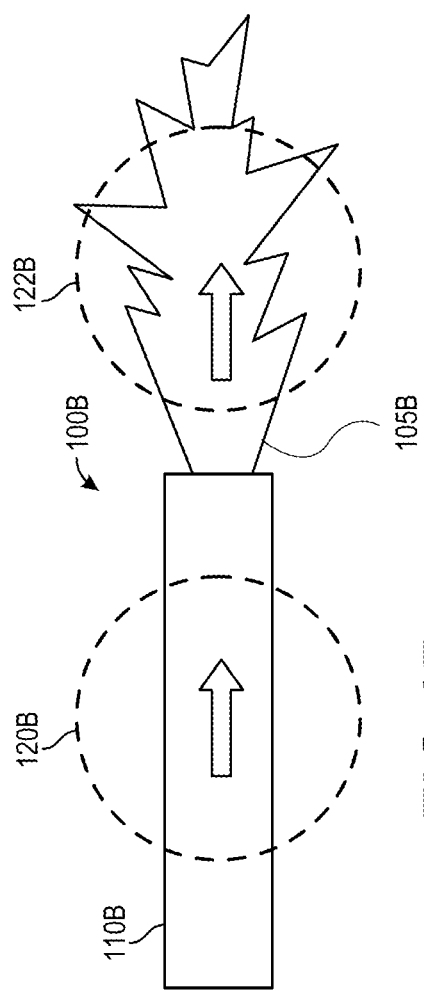

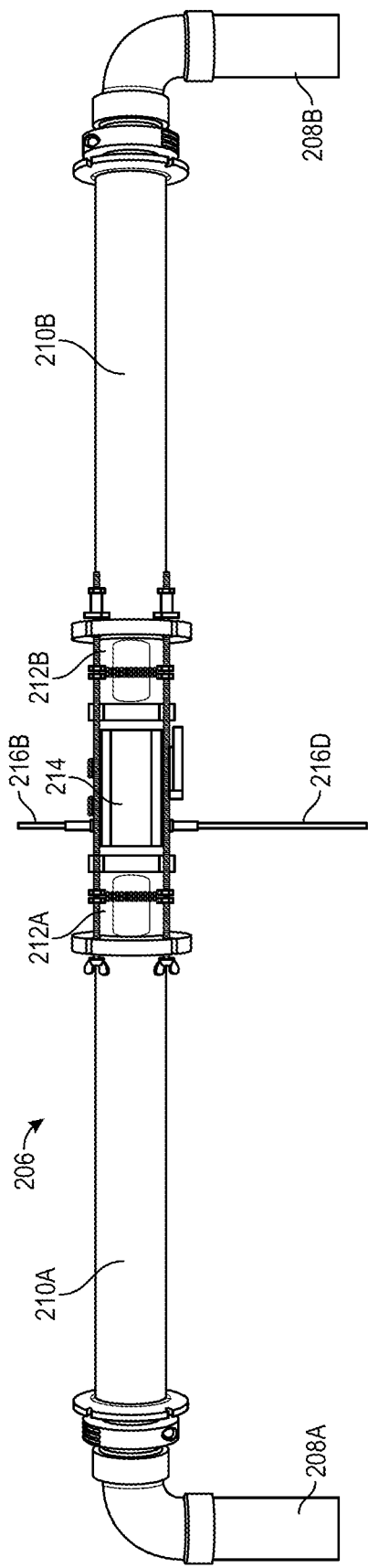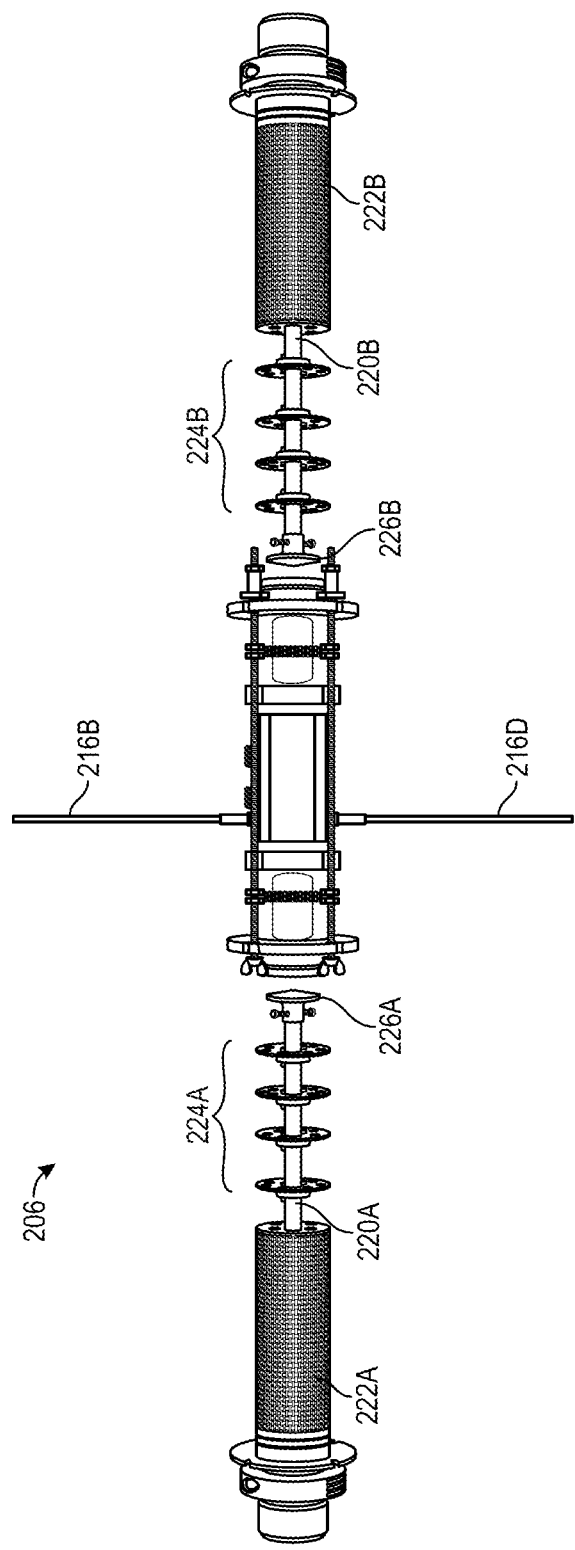

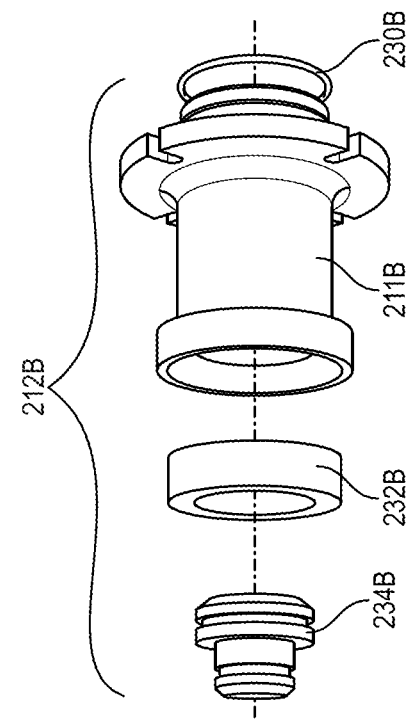
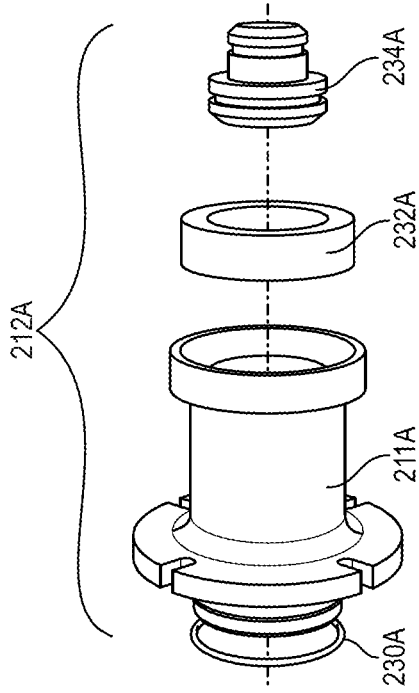
FIG. 4C

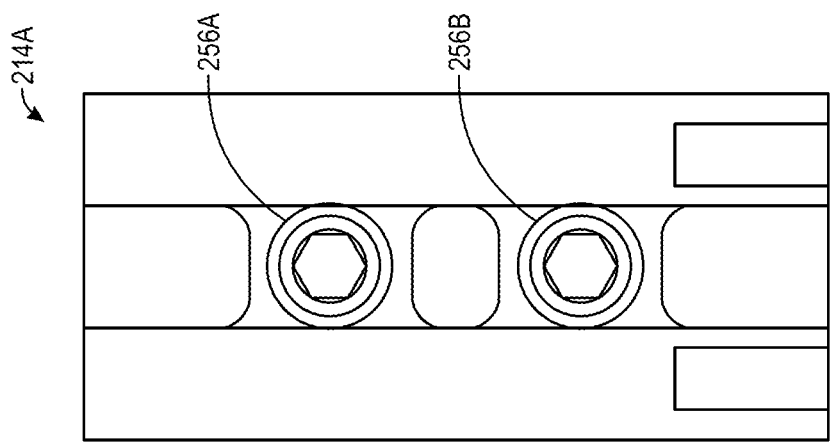
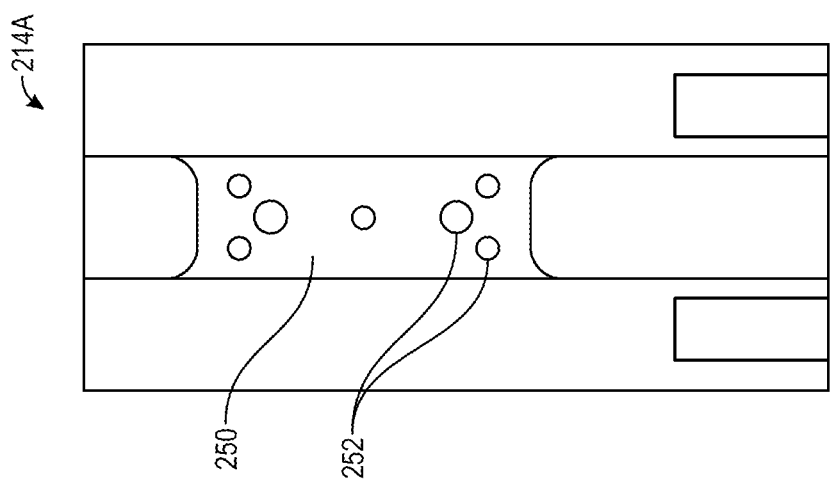

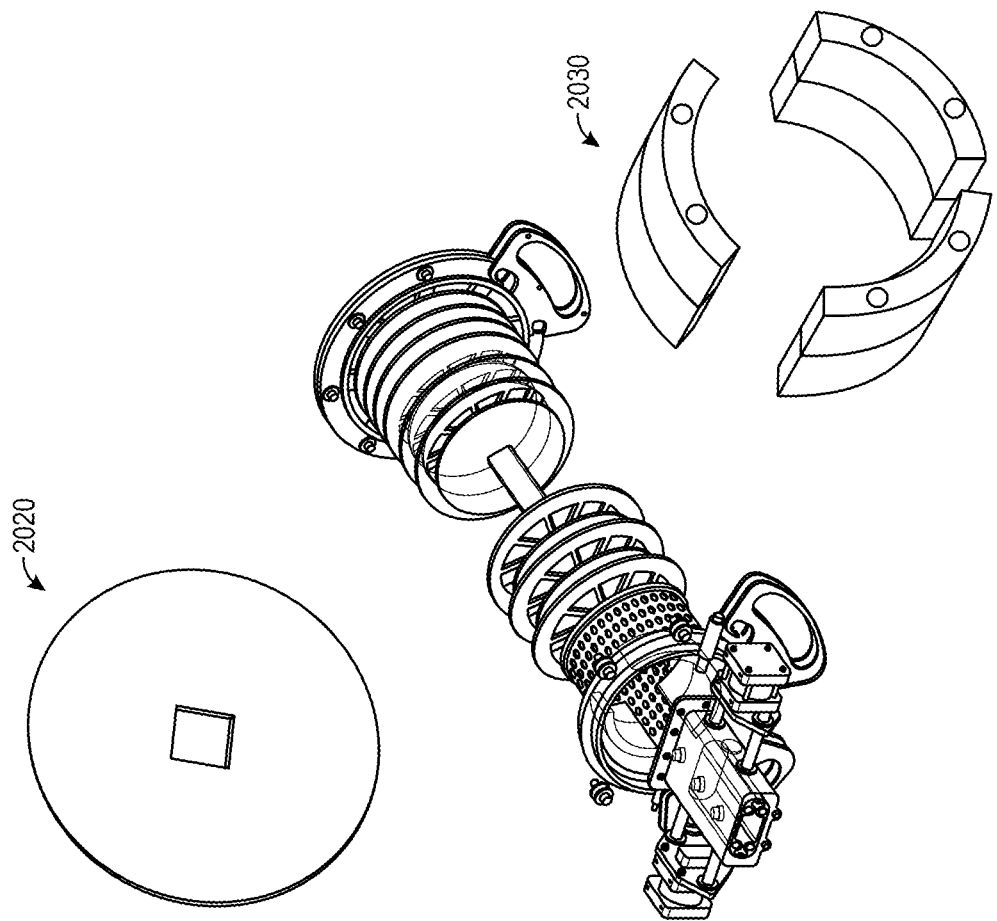
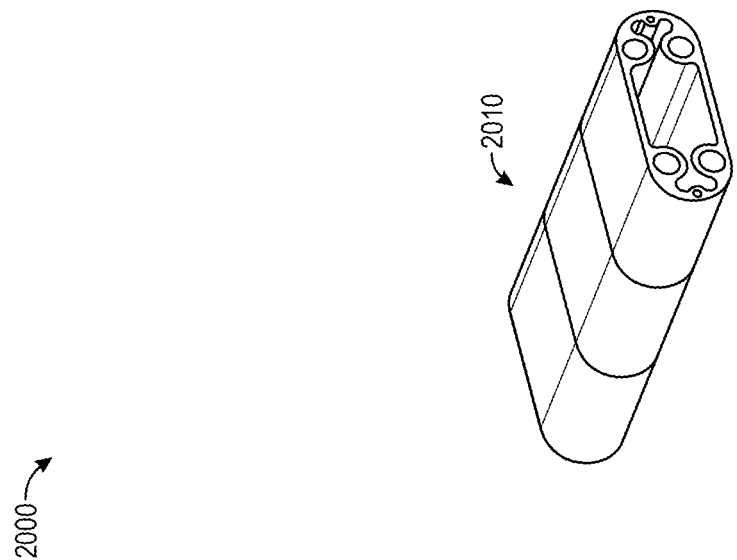
FIG. 20

LARGE FORMAT-FRACTIONAL THERMAL RUNAWAY CALORIMETER

CROSS-REFERENCE TO RELATED APPLICATIONS

This application is a continuation-in-part of U.S. patent application Ser. No. 16/175,152, filed on Oct. 30, 2018, which claims priority to U.S. Provisional Patent Application No. 62/668,596, filed on May 8, 2018. The entirety of these applications is incorporated by reference herein.

STATEMENT OF GOVERNMENT INTEREST

The embodiments described herein may be manufactured and used by or for the Government of the United States of America for governmental purposes without payment of any royalties thereon or therefor.

TECHNICAL FIELD

The present disclosure relates to testing of a battery cell during thermal runaway by calorimetry.

SUMMARY

A system for measuring a heat response of a battery cell is disclosed. The system includes a cell chamber configured to receive the battery cell therein. The cell chamber is configured to trigger the battery cell into a thermal runaway event while in the cell chamber, which causes the battery cell to eject an electrode winding, particles, and gas. The system also includes an ejecta bore muffler configured to receive electrode winding, the particles, and the gas. The system also includes an ejecta basket configured to be positioned at least partially within the ejecta bore muffler. The ejecta basket is configured to capture the electrode winding while allowing at least a portion of the particles, the gas, or both to pass therethrough. The system also includes a gas collection system configured to receive at least a portion of the gas that passes through the ejecta basket. The system also includes a computing system configured to determine energy yield data based at least partially upon an amount of heat transferred through a casing of the battery cell, an amount of heat in the electrode winding, an amount of heat in the particles, an amount of heat in the gas, or a combination thereof.

A system for measuring a heat response of a large-format lithium-ion battery cell during a thermal runaway event is also disclosed. The system includes a housing. The system also includes a cell chamber positioned at least partially within the housing. The cell chamber includes a bore formed partially therethrough. The bore receives the large-format lithium-ion battery cell therein. The large-format lithium-ion battery cell is triggered into the thermal runaway event while in the cell chamber, which causes the large-format lithium-ion battery cell to eject an electrode winding, particles, and gas. The system also includes an expansion chamber positioned at least partially within the housing. The expansion chamber is coupled to the cell chamber and configured to receive the electrode winding, the particles, and the gas therefrom. A cross-sectional area of the expansion chamber increases as it proceeds in a direction away or downstream from the cell chamber. The system also includes an ejecta bore muffler positioned at least partially within the housing. The ejecta bore muffler is coupled to the expansion chamber. The system also includes an ejecta basket positioned at least partially within the ejecta bore muffler. The ejecta basket captures the electrode winding while allowing the particles and the gas to pass therethrough. The system also includes a rod positioned at least partially within the ejecta bore muffler. The system also includes one or more baffles positioned at least partially within the ejecta bore muffler. The rod extends through the one or more baffles. The system also includes a mesh positioned at least partially within the ejecta bore muffler. The mesh is positioned at least partially around the rod and the one or more baffles. The one or more baffles, the mesh, or both stop at least a portion of the particles within the ejecta bore muffler. The system also includes a gas collection system positioned outside of the housing. The gas collection system receives the gas from the ejecta bore muffler. The system includes a first set of sensors that measures an amount of heat transferred through a casing of the large-format lithium-ion battery cell. The system includes a second set of sensors that measures an amount of heat in the electrode winding. The system includes a third set of sensors that measures an amount of heat in the particles, the gas, or both. The system also includes a computing system that receives the measurements of the amounts of heat from the first, second, and third sets of sensors and runs an energy yield algorithm to determine energy yield data based at least partially upon the amounts of heat. The energy yield data includes a total energy yield from the large-format lithium-ion battery cell during the thermal runaway event, a first fraction of the total energy yield transferred through the casing, a second fraction of the total energy yield in the electrode winding, and a third fraction of the total energy yield in the particles, the gas, or both.

A method for measuring a heat response of a battery cell is also disclosed. The method includes introducing a battery cell into a cell chamber. The method also includes triggering a thermal runaway event for the battery cell while the battery cell is in the cell chamber, which causes the battery cell to eject an electrode winding, particles, and gas. The method also includes measuring an amount of heat transferred through a casing of the battery cell during the thermal runaway event, an amount of heat in the electrode winding, an amount of heat in the particles, an amount of heat in the gas, or a combination thereof. The method also includes determining, using a computing system, energy yield data based at least partially upon the amount of heat transferred through the casing, the amount of heat in the electrode winding, the amount of heat in the particles, the amount of heat in the gas, or the combination thereof.

Other aspects and features of the embodiments described herein will become apparent from the following description and the accompanying drawings, illustrating the principles of the embodiments by way of example only.

BRIEF DESCRIPTION OF THE DRAWINGS

The following figures form part of the present specification and are included to further demonstrate certain aspects of the presently described subject matter and should not be used to limit it. The present subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

FIGS. 1A and 1B illustrate battery cells during thermal runaway, according to embodiments described herein.

FIGS. 3A and 3B illustrate an external view and an internal view of a calorimeter of the system shown in FIG. 2, respectively, according to an embodiment.

FIGS. 4B and 4C illustrate exploded, perspective views of FIG. 4A, according to an embodiment.

FIGS. 6A and 6B illustrate two opposing sides of the cell chamber, according to an embodiment. More particularly, FIG. 6A illustrates a side view of a first side of the cell chamber including a nail-penetration system mount interface, and FIG. 6B illustrates a side view of a second, opposing side of the cell chamber including one or more (e.g., two) universal thermocouple set screws, according to an embodiment.

FIGS. 7A and 7B show an upstream view of the calorimeter ejecta mating assembly, and FIG. 7C shows a downstream view of the ejecta mating assembly, according to an embodiment.

FIG. 20 illustrates a perspective view of a calibration heater system, according to an embodiment.

DETAILED DESCRIPTION

Small Format-Fractional Thermal Runaway Calorimeter (S-FTRC)

Lithium-ion (Li-ion) batteries deliver competitive energy storage solutions to a growing global market that spans the aerospace, automotive, medical, military and defense, portable electronics, railway, and space-exploration industries. Although this technology is characterized by leading performance characteristics, Li-ion battery utilization is burdened with safety concerns due to the inherent possibility of thermal runaway (TR). Thermal runaway is a process by which the Li-ion cell experiences rapid exothermic decomposition that ultimately results in the release of heat and high-temperature gases and other ejected material. An aspect to successful thermal modeling of battery cells, and thereby developing safe, high-performing battery designs, is to quantify the total energy released, and then to discern the fractional energy liberated through the cylindrical casing or "can" of a battery cell, such as 18650 Li-ion cell, as compared to the fractional energy ejected from the casing/can when the cell goes into thermal runaway.

Figure 1A:
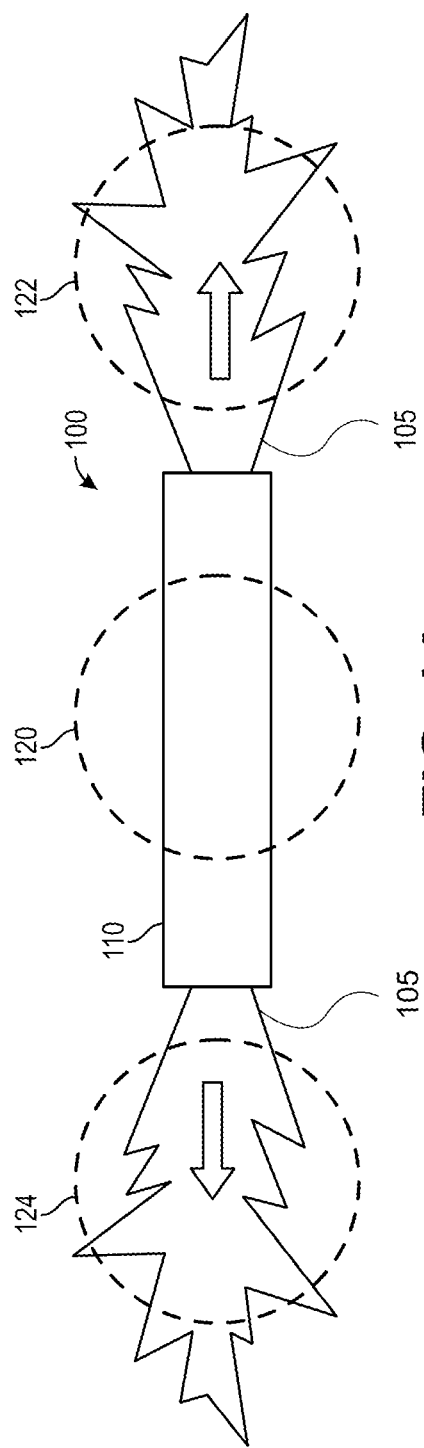

FIG. 1A illustrates a Li-ion battery cell 100 during a thermal runaway event, according to an embodiment. As described above, the Li-ion cell 100 may include an outer casing (also referred to as a can) 110 and internal electrode winding/stack-up material. At least a portion of the internal electrode winding/stack-up material may be released from the Li-ion cell 100 (e.g., the casing/can 110) as an ejecta/ejected material 105 during a thermal runaway event. More particularly, the Li-ion cell 100 in thermal runaway has one or more (e.g., two or three) fractions of energy. A first fraction 120, liberated through the casing 110, may be measured by sensing a temperature increase in/of cell chamber assembly components containing the Li-ion cell 100. The other fraction(s) 122, 124, ejected from end(s) of the casing 110, may be measured by sensing an increase in temperature in/of ejecta mating assemblies and ejecta bore assemblies containing the ejected material 105, as described in more detail below.

Figure 2:
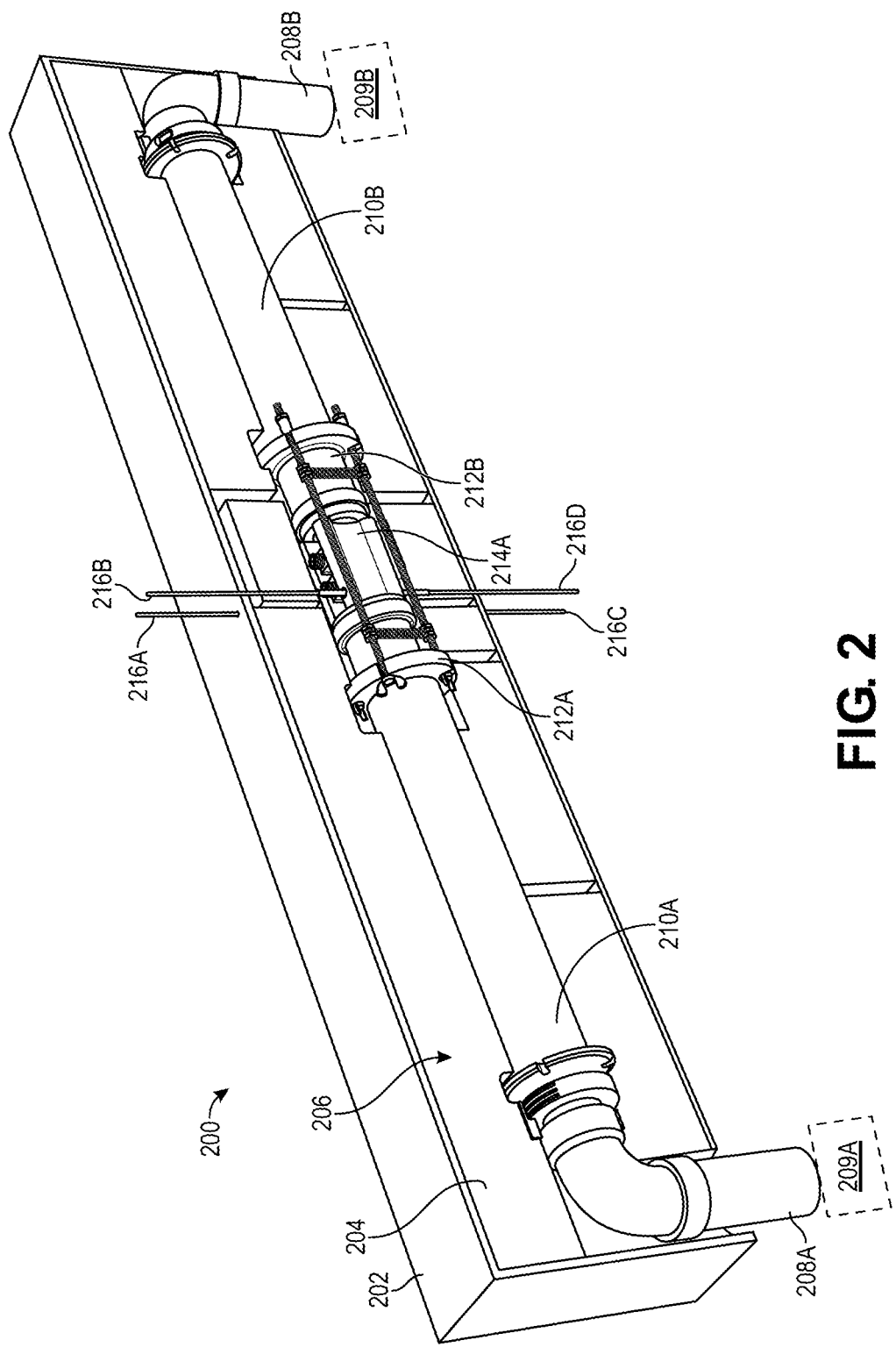
FIG. 2 illustrates a system for testing a battery cell during a thermal runaway event, according to an embodiment.

FIG. 2 illustrates a system 200 for testing the battery cell 100 during a thermal runaway event, according to an embodiment. The system 200 may include a housing 202. The housing 202 may be or include a portable, molded shell made at least partially of plastic. The housing 202 protects the insulation 204 and calorimeter positioned therein, as discussed below.

The system 200 may also include an insulation 204 that is positioned at least partially within the housing 202. The insulation 204 have a conductivity that is less than or equal to about 0.04 W m$^{-2}$° C.$^{-1}$, less than or equal to about 0.02 W m$^{-2}$° C.$^{-1}$, or less than or equal to about 0.01 W m$^{-2}$° C.$^{-1}$. The system 200 may also include a fractional thermal runaway calorimeter (FTRC) 206. As shown, the calorimeter 206 may be positioned at least partially (e.g., completely) within the housing 202 and/or the insulation 204 with the possible exception of the exhaust ports described below. As described below, the calorimeter 206 may be configured to measure total heat response and/or fractional heat response of a cell (e.g., the Li-ion cell 100) during a thermal runaway event.

The calorimeter 206 may include one or two exhaust ports/vents (two are shown: 208A, 208B). More particularly, the calorimeter 206 may include a first (e.g., negative) side exhaust port 208A and a second (e.g., positive) side exhaust port 208B. Gases ejected from a first (e.g., negative) terminal of the Li-ion cell 100 can exit the calorimeter 206 via the negative side exhaust port 208A, and gases ejected from a second (e.g., positive) terminal of the Li-ion cell 100 can exit the calorimeter 206 via the positive side exhaust port 208B. In at least one embodiment, the exhaust ports 208A, 208B may be or include vents that are drilled into the housing 202.

In at least one embodiment, the calorimeter 206 may also include a gas collection system 209A, 209B coupled to the exhaust ports 208A, 208B and/or to a muffler, and the gas collection system 209A, 209B may capture and/or measure heat in the gas from the Li-ion cell 100. More particularly, the gas collection system 209A, 209B may measure and quantify the heat transferred through the ejected gases by measuring the exhaust gas temperature, flow rate, and/or volume. The gas collection system 209A, 209B may also sample the gas and perform a composition analysis. For example, the gas collection system 209A, 209B may include an internal bag that fills with the gases generated from the thermal runaway event. As the bag inflates, it may push the air inside the gas collection system 209A, 209B outward through a gas (e.g., air) velocity sensor.

The calorimeter 206 may also include one or two ejecta bore assemblies (two are shown: 210A, 210B). More particularly, the calorimeter 206 may include a first (e.g., negative) side ejecta bore assembly 210A and a second (e.g., positive) side ejecta bore assembly 210B. During a thermal runaway event, the Li-ion cell 100 may eject material (i.e., ejecta material) from one or both sides/terminals of the cell 100. The negative side ejecta bore assembly 210A may capture the ejecta material from the negative terminal of the Li-ion cell 100, and the positive side ejecta bore assembly 210B may capture the ejecta material from the positive terminal of the Li-ion cell 100. The ejecta bore assemblies 210A, 210B may be configured to measure the energy associated with the ejecta material leaving the Li-ion cell 100 due to thermal runaway. As used here, ejecta material refers to ejected soot, ejected cell materials, and/or generated gases.

The calorimeter 206 may also include one or two ejecta mating assemblies (two are shown: 212A, 212B). More particularly, the calorimeter 206 may include a first (e.g., negative) side ejecta mating assembly 212A and a second (e.g., positive) side ejecta mating assembly 212B. During a thermal runaway event, in addition to the ejecta material, the Li-ion cell 100 may also eject complete or partial electrode windings from one or both sides/terminals of the cell 100. The negative side ejecta mating assembly 212A may capture the electrode windings ejected from the negative terminal of the Li-ion cell 100, and the positive side ejecta mating assembly 212B may capture electrode windings ejected from the positive terminal of the Li-ion cell 100. In other words, the ejecta mating assemblies 212A, 212B may prevent the windings from reaching the ejecta bore assemblies 210A, 210B. The ejecta mating assemblies 212A, 212B may also measure the energy specifically associated with the ejected electrode windings. The ejecta mating assemblies 212A, 212B may be thermally-isolated from the cell chamber 214A (introduced below).

The symmetry presented by the positive and negative sides of the ejecta bore assemblies 210A, 210B and the ejecta mating assemblies 212A, 212B may provide a dual-sided, ambidextrous testing configuration that supports gases, ejecta material, and windings that are ejected from both the positive and negative terminals of the cell. However, in other embodiments, the calorimeter 206 may provide a single-sided testing configuration (e.g., including the negative side ejecta bore assembly 210A and the negative side ejecta mating assembly 212A and omitting the positive side ejecta bore assembly 210B and the positive side ejecta mating assembly 212B).

The calorimeter 206 may also include a cell chamber 214A where the Li-ion cell 100 may be placed for testing. The cell chamber 214A may be configured to measure the energy emitted from the Li-ion cell 100 during/due to thermal runaway. The cell chamber 214A may support a heater trigger mechanism and/or provide a mounting interface for an optional nail-penetration trigger mechanism, as discussed below. The cell chamber 214A may also include x-ray transparent materials to support in-situ, high-speed tomography and/or x-ray videography during thermal runaway testing. The cell chamber 214A may be centrally-located in the calorimeter 206. As shown, the cell chamber 214A in FIG. 2 is sized and shaped to receive an 18650 Li-ion cell; however, as will be discussed below, differently-sized cell chambers may be used in the calorimeter 206 to receive Li-ion cells of different sizes.

The calorimeter 206 may also include one or more cartridge heaters (four are shown: 216A-D) that may be used to trigger the Li-ion cell 100 into thermal runaway by thermal heating.

FIG. 3A illustrates an external side view of the calorimeter 206, according to an embodiment. FIG. 3B illustrates an internal side view of the calorimeter 206, according to an embodiment. The calorimeter 206 may also include one or more rods (two are shown: 220A, 220B). More particularly, the calorimeter 206 may include a first (e.g., negative) side rod 220A and a second (e.g., positive) side rod 220B.

The calorimeter 206 may also include one or more high-conductivity mesh screens (two are shown: 222A, 222B). More particularly, the calorimeter 206 may include a first (e.g., negative) side mesh screen 222A and a second (e.g., positive) side mesh screen 222B. The mesh screens 222A, 222B may be made of a metallic material such as copper. The mesh screens 222A, 222B may be positioned at least partially around the rods 220A, 220B, respectively. The mesh screens 222A, 222B may be annular or cylindrical.

The calorimeter 206 may also include one or two sets of axial baffles (two sets are shown: 224A, 224B). More particularly, the calorimeter 206 may include a first set of (e.g., negative) side axial baffles 224A and a second set of (e.g., positive) side axial baffles 224B. The baffles 224A, 224B may be positioned at least partially around the rods 220A, 220B, respectively, and axially-offset from the mesh screens 222A, 222B, respectively. Each set of baffles 224A, 224B may include from about one to about ten baffles, from about two to about eight baffles, or from about three to about six baffles. The mesh screens 222A, 222B and/or the baffles 224A, 224B may decelerate and trap ejecta to vent gases that are emitted from the Li-ion cell when in a state of thermal runaway.

The calorimeter 206 may also include one or more witness plates (two are shown: 226A, 226B) designed to withstand the impact of the initial thermal runaway blast. More particularly, the calorimeter 206 may include a first (e.g., negative) side witness plate 226A and a second (e.g., positive) side witness plate 226B. The witness plates 226A, 226B may be positioned at least partially around and/or coupled to inner ends of the rods 220A, 220B, respectively.

As shown, the negative side axial baffles 224A may be positioned axially-between the negative side mesh screen 222A and the negative side witness plate 226A, and the positive side axial baffles 224B may be positioned axially-between the positive side mesh screen 222B and the positive side witness plate 226B. Together, the mesh screens 222A, 222B, the baffles 224A, 224B, and/or the witness plates 226A, 226B create a tortuous path that arrests the flame(s) of thermal runaway and prevent material from leaving the calorimeter 206.

Figure 4A:
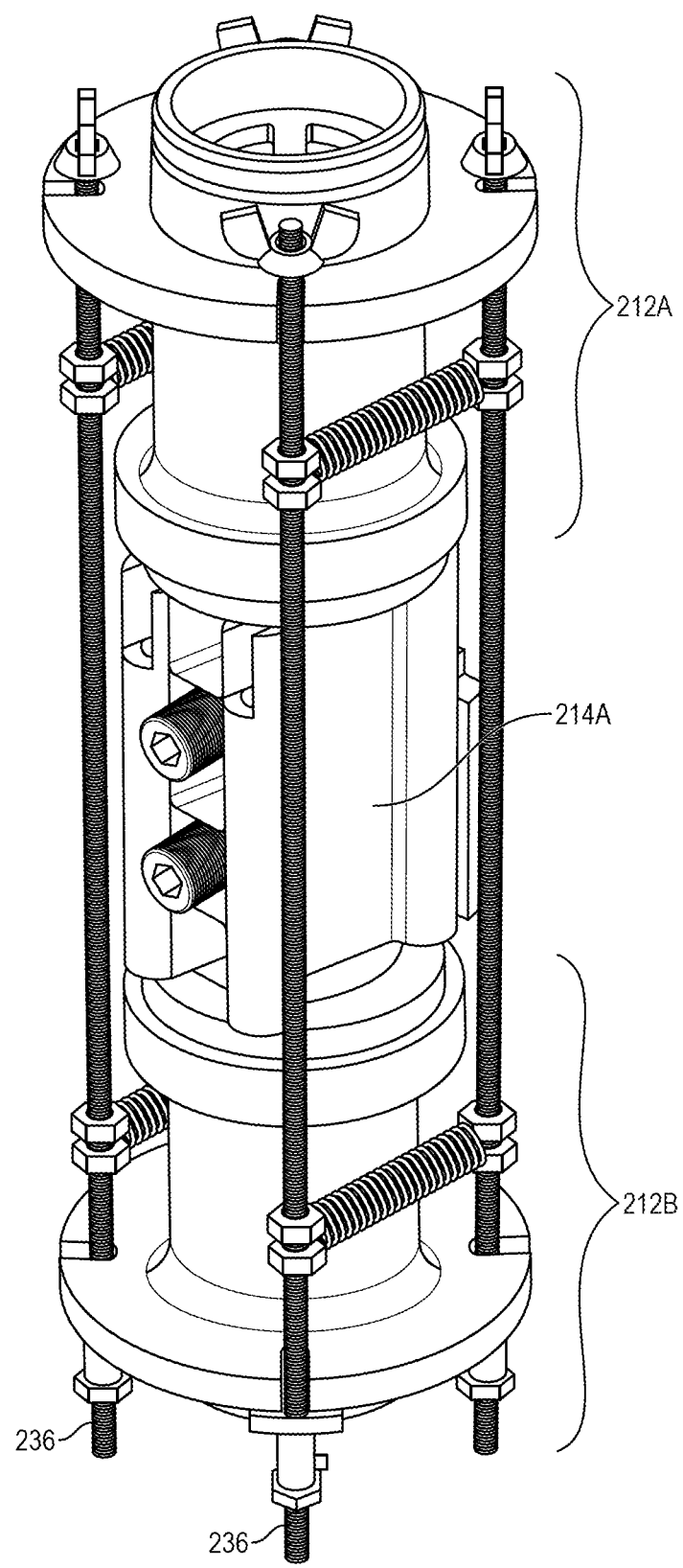
FIG. 4A illustrates a perspective view of a cell chamber and positive and negative side ejecta mating assemblies of the calorimeter, according to an embodiment.
Figure 4B:
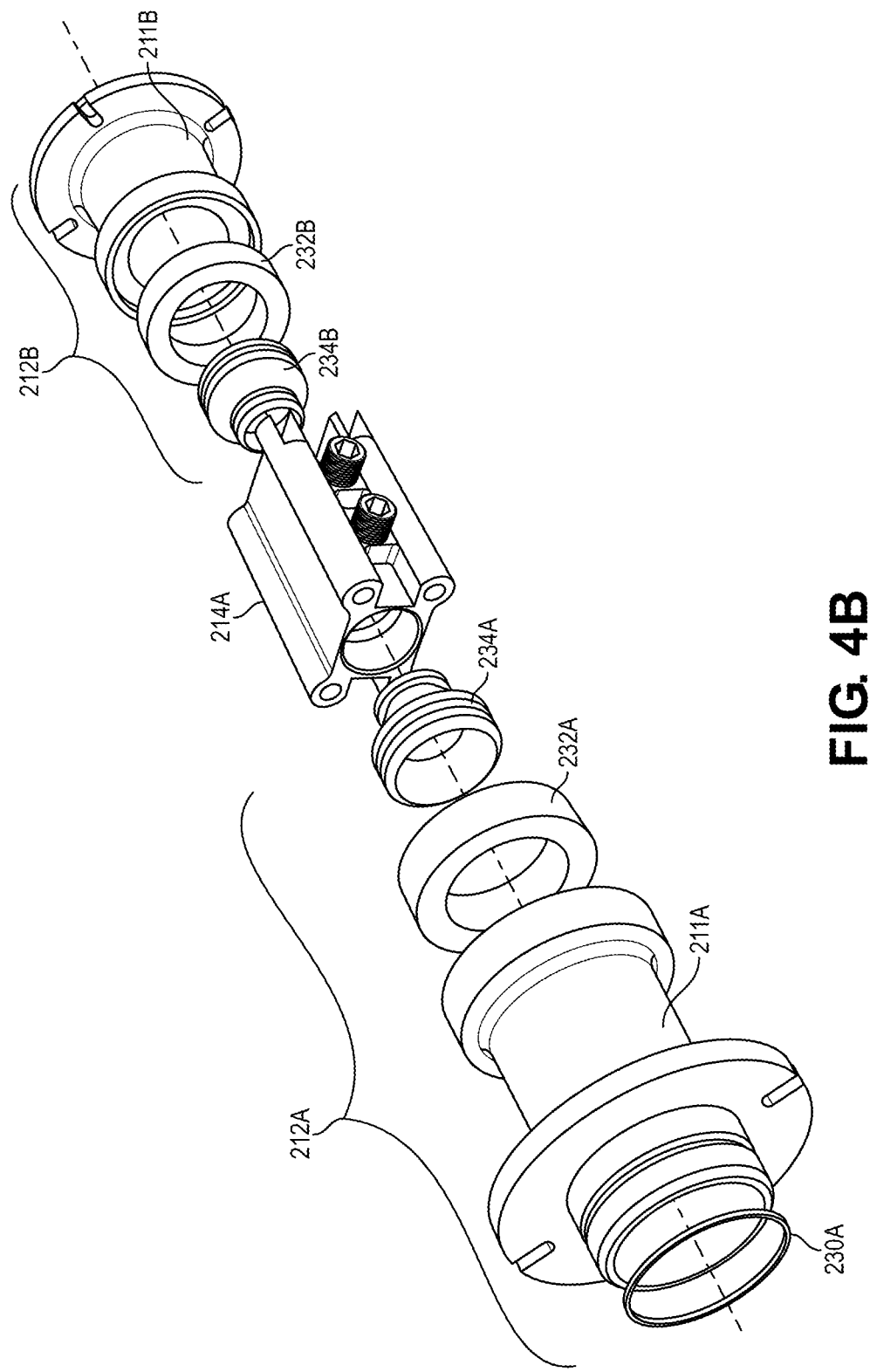

FIG. 4A illustrates a perspective view of the cell chamber 214A (e.g., configured to fit an 18650 Li-ion cell) and the positive and negative side ejecta mating assemblies 212A, 212B, according to an embodiment. FIGS. 4B and 4C illustrate exploded, perspective views of FIG. 4A, according to an embodiment. The ejecta mating assemblies 212A, 212B may each include a first seal (two are shown: 230A, 230B). More particularly, the negative side ejecta mating assembly 212A may include a first negative side seal 230A configured to contact an outer side of a negative side ejecta mating component 211A, and the positive side ejecta mating assembly 212B may include a first positive side seal 230B configured to contact an outer side of a positive side ejecta mating component 211B. The first seals 230A, 230B may be or include elastomeric O-rings.

The ejecta mating assemblies 212A, 212B may each also include a low thermal conductivity bushing (two are shown: 232A, 232B). More particularly, the negative side ejecta mating assembly 212A may include a bushing 232A configured to fit at least partially within an inner side of the negative side ejecta mating component 211A, and the positive side ejecta mating assembly 212B may include a bushing 232B configured to fit at least partially within an inner side of the positive side ejecta mating component 211B. The bushings 232A, 232B may be at least partially ceramic.

The ejecta mating assemblies 212A, 212B may each also include a second seal (two are shown: 234A, 234B). More particularly, the negative side ejecta mating assembly 212A may include a second negative side seal 234A configured to fit at least partially within the negative side ejecta mating component 211A and/or the negative side bushing 232A, and the positive side ejecta mating assembly 212B may include a second positive side seal 234B configured to fit at least partially within the positive side ejecta mating component 211B and/or the positive side bushing 232B. The second seals 234A, 234B may also be configured to contact or otherwise fit at least partially within opposing sides of the cell chamber 214A. The second seals 234A, 234B may be or include metallic (e.g., brass) pressure-assisted seals.

As shown in FIG. 4A, the calorimeter 206 may also include one or more brackets and/or clamps 236. The brackets and/or clamps 236 may be spring-loaded and configured to hold the components shown in FIGS. 4A-4C together. The brackets and/or clamps 236 may be used to quickly assemble and disassemble at least a portion of the calorimeter 206.

Figure 5A:
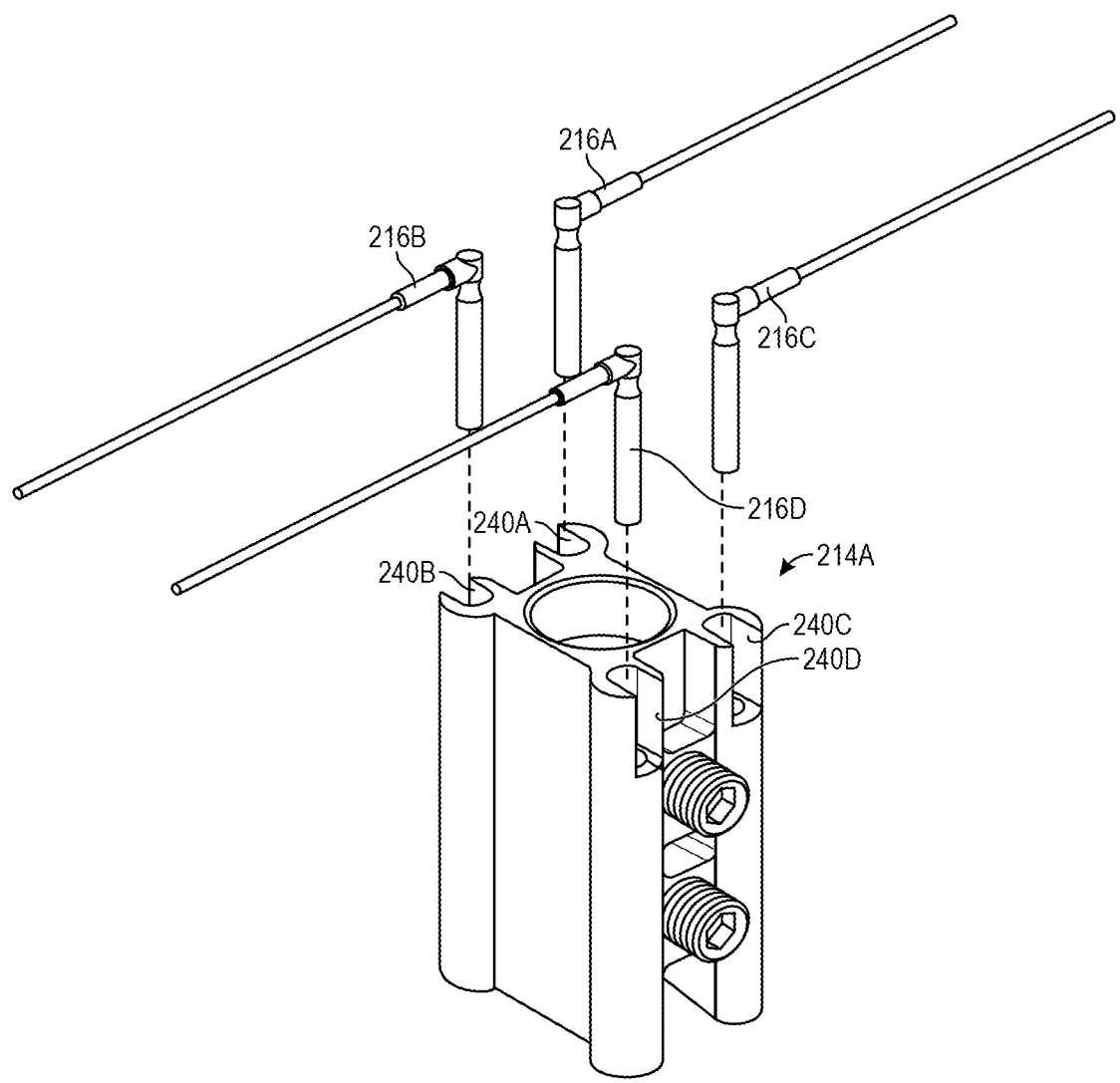
FIG. 5A illustrates a perspective view of the cell chamber for a Li-ion 18650 cell, according to an embodiment.
Figure 5B:
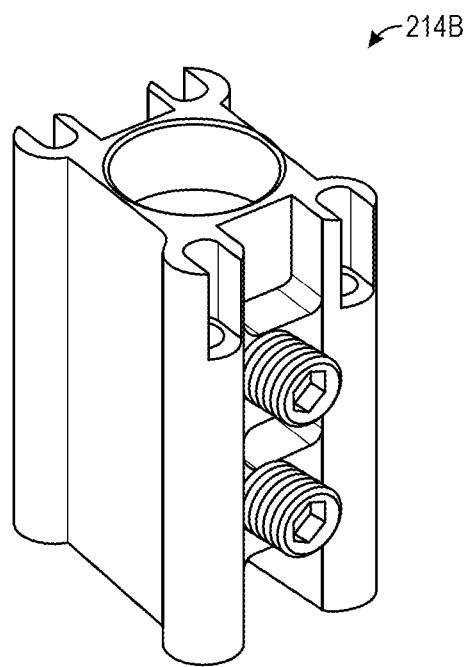
FIG. 5B illustrates a perspective view of a cell chamber for a Li-ion 21700 cell, according to an embodiment.
Figure 5C:
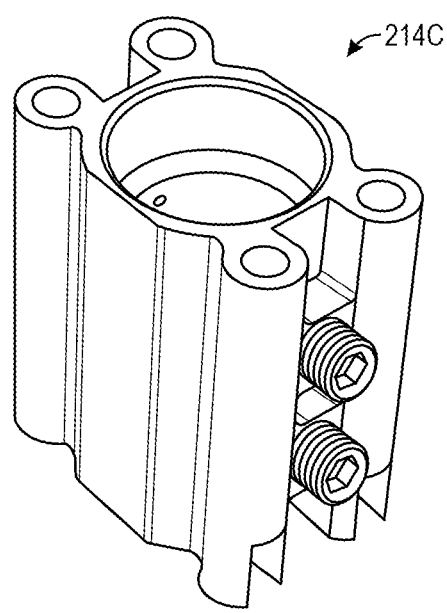
FIG. 5C illustrates a perspective view of a cell chamber for a Li-ion D-cell, according to an embodiment.

FIG. 5A illustrates a perspective view of the cell chamber 214A for an 18650 Li-ion cell, according to an embodiment. FIG. 5B illustrates a perspective view of a cell chamber 214B for a 21700 Li-ion cell, according to an embodiment. FIG. 5C illustrates a perspective view of a cell chamber 214C for a D-cell, according to an embodiment. As will be appreciated, the cell chambers 214A-C may be substantially identical, except for being sized and/or shaped differently to accommodate differently-sized and/or differently-shaped Li-ion cells.

As may be seen in FIG. 5A, the cell chamber 214A may include one or more slots (four are shown: 240A-D) that are configured to receive at least a portion of the one or more cartridge heaters 216A-D. The slots 240A-D may be positioned on the four corners of the cell chamber 214A.

FIGS. 6A and 6B illustrate two opposing sides of the cell chamber 214A, according to an embodiment. More particularly, FIG. 6A illustrates a side view of a first side of the cell chamber 214A, according to an embodiment. As shown in FIG. 6A, the first side may include a nail-penetration system mount interface 250. The nail-penetration system mount interface 250 may include one or more openings (eight are shown: 252) configured to receive nails that may contact the Li-ion cell 100 and initiate the thermal runaway event. The nails may be used instead of, or in addition to, the cartridge heaters 216A-D to initiate the thermal runaway event.

FIG. 6B illustrates a side view of a second, opposing side of the cell chamber 214A, according to an embodiment. As shown in FIG. 6B, the second side may include one or more universal thermocouple set screws (two are shown: 256A, 256B). The screws 256A, 256B are configured to measure changes (e.g., increases) in temperature during testing (e.g., during thermal runaway). The increases in temperature may be used/combined with the known mass and specific heat capabilities of the components in the calorimeter 206 to determine the energy change of the system 200. In at least one embodiment, the interface 250 and/or the screws 256A, 256B may be universal for the cell chambers 214A-C.

Figure 7C:
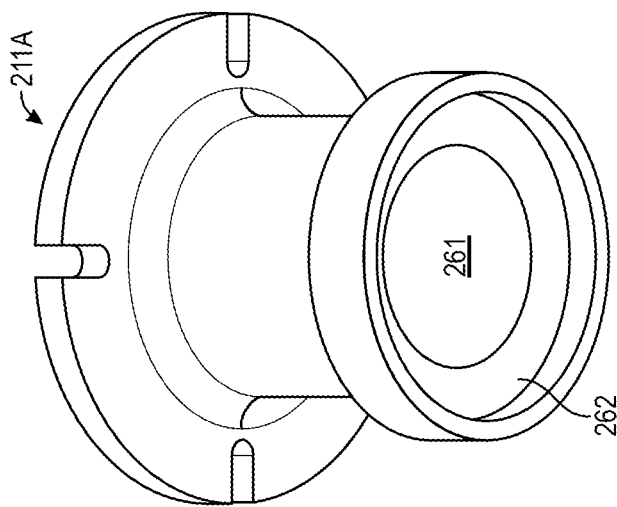
FIGS. 7A-7C illustrate perspective views of the ejecta mating assembly, according to an embodiment. More particularly.
Figure 7B:
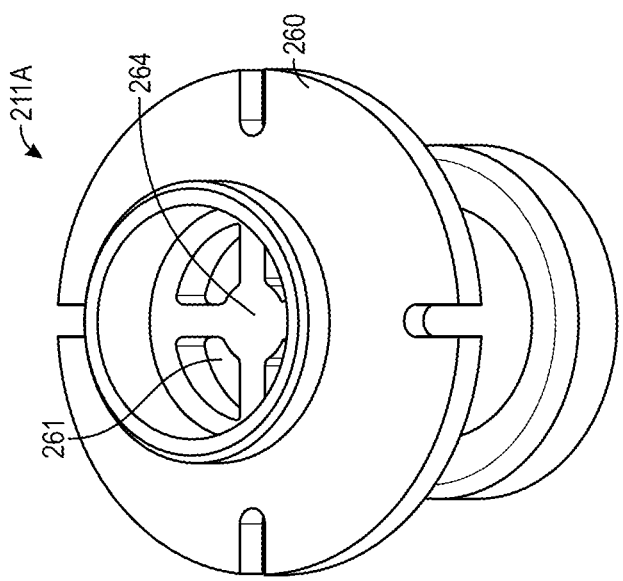
Figure 7A:
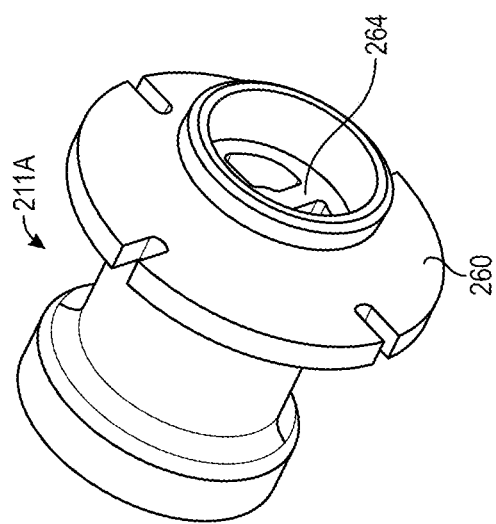

FIGS. 7A-7C illustrate perspective views of the negative side ejecta mating component 211A, according to an embodiment. The ejecta mating component 211A may have a bore 261 extending axially-therethrough. FIGS. 7A and 7B show an upstream view of the negative side ejecta mating component 211A, according to an embodiment. The upstream side 260 of the ejecta mating component 211A may be proximate to the cell chamber 214A and configured to receive the bushing 232A. FIG. 7C shows a downstream view of the ejecta mating component 211A, according to an embodiment. The downstream side 262 of the ejecta mating component 211A may be proximate to the ejecta bore assembly 210A. The downstream side 262 may include an obstruction 264 that is configured to prevent ejected electrode windings from passing therethrough while allowing the gases and/or ejecta material to pass therethrough. As shown, the obstruction 264 may be in the form of a crosshair. Although the negative side ejecta mating component 211A is shown in FIGS. 7A-7C, in at least one embodiment, the positive side ejecta mating component 211B may be identical and is thus omitted here to prevent redundancy.

Figure 8:
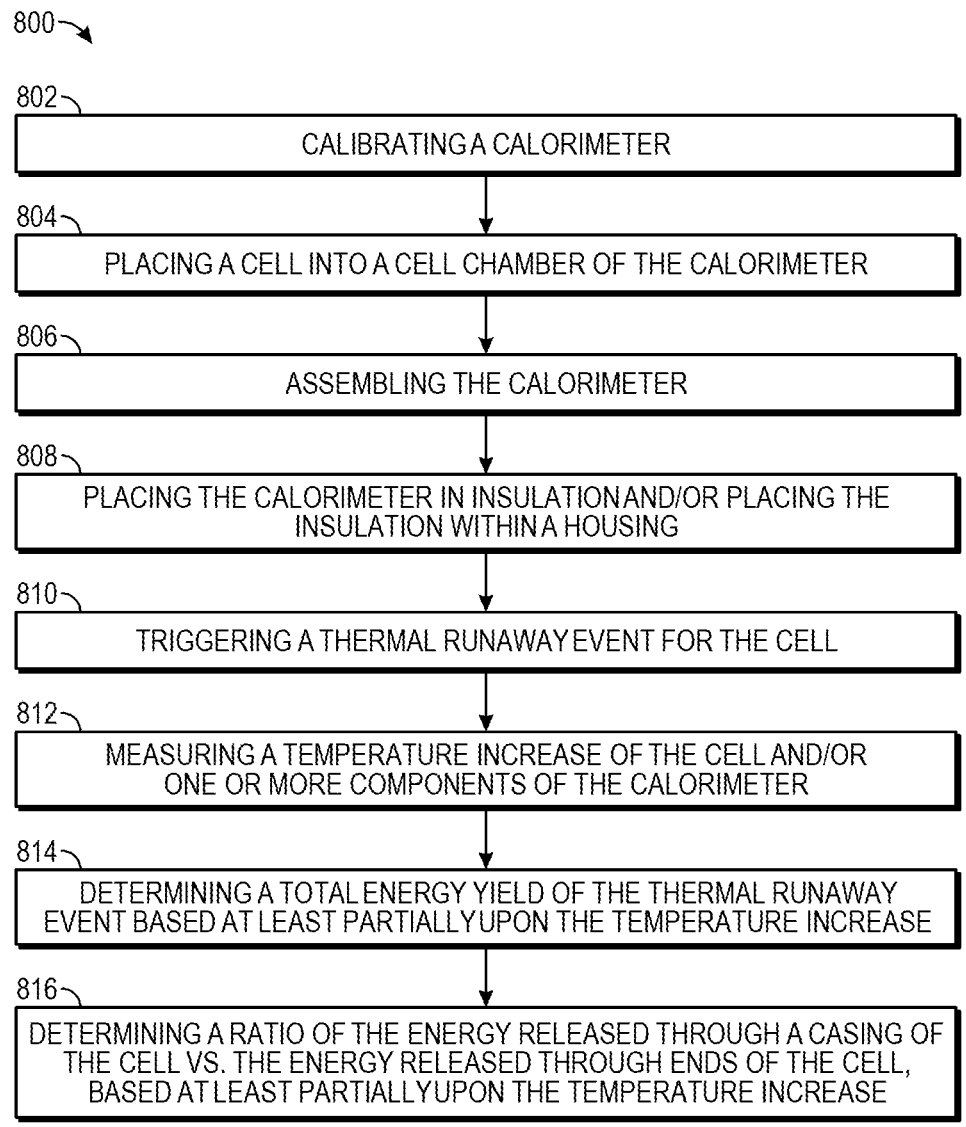
FIG. 8 illustrates a flowchart of a method for measuring a heat response of a cell during a thermal runaway event, according to an embodiment.

FIG. 8 illustrates a flowchart of a method 800 for measuring a heat response of a cell 100 during a thermal runaway event, according to an embodiment. More particularly, the method 800 may be used to measure a total and/or a fractional heat response of the Li-ion cell 100 in thermal runaway (e.g., using the system 200). The method 800 may include calibrating the calorimeter 206, as at 802. The calorimeter 206 may be calibrated by adding a known quantity of heat to the system 200 (e.g., to the calorimeter 206) to determine the heat loss of the calorimeter 206 through the insulation 204. The calibration may enable the accuracy and/or precision of the calorimeter 206 to be measured/determined.

The method 800 may also include placing the (e.g., Li-ion) cell 100 into the cell chamber 214A, as at 804. The method 800 may also include assembling the calorimeter 206 (e.g., after the cell 100 is in the chamber 214A), as at 806. As described above, in one embodiment, only the negative side ejecta mating assembly 210A and the negative side ejecta bore assembly 212A may be used (and the positive side ejecta mating assembly 210B and the positive side ejecta bore assembly 212B may be omitted). In another embodiment, only the positive side ejecta mating assembly 210B and the positive side ejecta bore assembly 212B may be used (and the negative side ejecta mating assembly 210A and the negative side ejecta bore assembly 212A may be omitted). Either of these options may provide single-sided testing. In yet another embodiment, the negative and positive side ejecta mating assemblies 210A, 210B and the negative and positive ejecta bore assemblies 212A, 212B may be used (e.g., for dual-sided testing).

The method 800 may also include placing/encasing the calorimeter 206 in the insulation 204, and/or placing the insulation 204 within the housing 202, as at 808. The method 800 may also include triggering a thermal runaway event for the Li-ion cell 100, as at 810. The thermal runaway event may be triggered using rapid heating (e.g., via the cartridge heaters 216A-D) and/or nail penetration (e.g., through the nail-penetration system mount interface 250). The rapid heating trigger may not penetrate or perforate the cell casing 110. The cell casing 110 may remain within the cell chamber 214A during thermal runaway, even when the gases, ejecta material, and/or windings are ejected from one or both ends of the Li-ion cell 100.

The method 800 may also include measuring a temperature increase of the Li-ion cell 100 and/or one or more components of the calorimeter 206 (e.g., the ejecta mating assembly 210A, 210B, the ejecta bore assembly 212A, 212B, and/or the cell chamber 214A), as at 812. In at least one embodiment, the temperature increase may be measured at least in part by the thermocouple screws 256A, 256B.

The method 800 may also include determining a total energy yield of the thermal runaway event based at least partially upon the temperature increase, as at 814. The total energy yield may be determined by calculating the m*Cp*ΔT, i.e., the change in energy for a general mass, for each component of the calorimeter 206 and adding together. As used herein, m refers to the mass of one or more components in the calorimeter 206, Cp refers to the specific heat capacity of one or more components in the calorimeter 206, and ΔT a change in temperature of one more components in the calorimeter 206. The total energy may be determined at least partially due to the system 200 trapping all ejected solids, liquids, and gases, the cell casing 110 fitting precisely within the cell chamber 214A, the cell chamber 214A being very conductive, pressure-assisted seals 230A, 230B, 234A, 234B are used for sectional interfaces, the housing 202 includes adiabatic insulation 204 around the calorimeter 206, or a combination thereof.

The method 800 may also include determining a ratio of the energy released (during the thermal runaway event) through the casing/can 110 vs. the energy released (during the thermal runaway event) through ejecta material exiting via ends of the cell 100, based at least partially upon the temperature increase, as at 816. In one example, the ratio may be determined by:
a. adding the energies of the cell casing 110 and the cell chamber assembly 214A together to determine the energy released through the cell casing 110,
b. adding the energy of the negative side ejecta mating assembly 212A, the negative side ejecta bore assembly 210A, the negative side rod 220A, the negative side mesh screen 222A, the negative side baffles 224A, the negative side witness plate 226A, or a combination thereof together to determine the energy released through the negative side ejecta material, and
c. adding the energy of the positive side ejecta mating assembly 212B, the positive side ejecta bore assembly 210B, the positive side rod 220B, the positive side mesh screen 222B, the positive side baffles 224B, the positive side witness plate 226B, or a combination thereof together to determine the energy released through the positive side ejecta material.

In at least one embodiment, the total energy yield and/or the ratio may be determined by the system 200 (e.g., a computing system within the system 200). The computing system may be positioned within or outside the housing 202. The computing system may include one or more processors and a memory system. The memory system may include one or more non-transitory computer-readable media storing instructions that, when executed by at least one of the one or more processors, cause the computing system to perform operations. The operations may include determining the total energy yield and/or determining the ratio.

Large Format-Fractional Thermal Runaway calorimeter (L-FTRC)

The systems and methods disclosed herein may be directed to a large format-fractional thermal runaway calorimeter (L-FTRC). The L-FTRC may be configured to measure and quantify the total thermal runaway energy yield for large-format battery cells. As used herein, large-format battery (e.g., lithium-ion) cells have an Ampere-Hour (Ah) capacity that is greater than or equal to about 50 Ah, about 100 Ah, about 200 Ah, or more.

FIG. 1B illustrates a large format battery cell 100B during a thermal runaway event, according to an embodiment further described herein. The large format battery cell 100B may include an outer casing 110B and internal electrode winding/stack-up material. At least a portion of the internal electrode winding/stack-up material may be released from the battery cell 100B (e.g., the casing) as an ejecta/ejected material 105B during a thermal runaway event. More particularly, the cell 100B in thermal runaway has one or more (e.g., two or three) fractions of energy. A first fraction 120B, liberated through the cell casing 110B, may be measured, at least in part, by sensing a temperature increase in/of cell chamber assembly components containing the cell 100B. Another fraction 122, ejected from one end of the cell 100B, may be measured by sensing an increase in temperature in/of ejecta mating assemblies and ejecta bore assemblies containing the ejected material 105B, as described in more detail below.

The L-FTRC may also be configured to measure and quantify separately, yet simultaneously (1) a fraction of the total thermal runaway energy that leaves the battery cell through the cell casing, (2) a fraction of the total thermal runaway energy in the (e.g., ejected) electrode winding, and (3) a fraction of the total thermal runaway energy in the (e.g., vented/ejected) particles and gases. The amount of residual energy remaining in the gases after they leave the L-FTRC and enter a gas collection system may also be measured and quantified. The composition of the gases after they leave the L-FTRC and enter the gas collection system may also be measured and quantified. For example, the gases in the gas collection system may be sampled (e.g., using a Hoke bottle), and the gas may be analyzed separately (e.g., outside of the gas collection system).

The total thermal runaway energy yield, the fractions thereof, and/or the composition may provide insight into parameters relevant to battery design that have not previously been measured. For example, battery designs including numerous cells in close proximity may rely on an understanding of the transfer of heat from a cell experiencing thermal runaway to the remainder of the system to ensure that a safe design is achieved. To provide an adequate thermal design for the battery, understanding the difference between the amount of energy that is released through the cell casing vs. that of the ejecta may aid in designing a volumetrically and gravimetrically optimized heat sink or conductive isolation for each cell. Furthermore, quantification of the energy released via vented gases and effluents may aid in designing suitable venting of these gases and the energy contained therein. Designs that adequately address the aforementioned points can preclude a single cell thermal runaway event from inducing propagation of the thermal runaway to other cells in the battery, and also the prevent catastrophic failure of the overall system.

The L-FTRC may reliably perform whole-cell closed-form calorimetry experiments on large-format lithium-ion cells. As described below, an ejecta basket of the L-FTRC may capture an entire ejected wet cell electrode winding (i.e., jellyroll) for energy content measurement while preventing it from passing into an ejecta bore (muffler). However, the L-FTRC may permit the flow of vent gases and effluents for measurement and collection downstream.

Figure 9A:
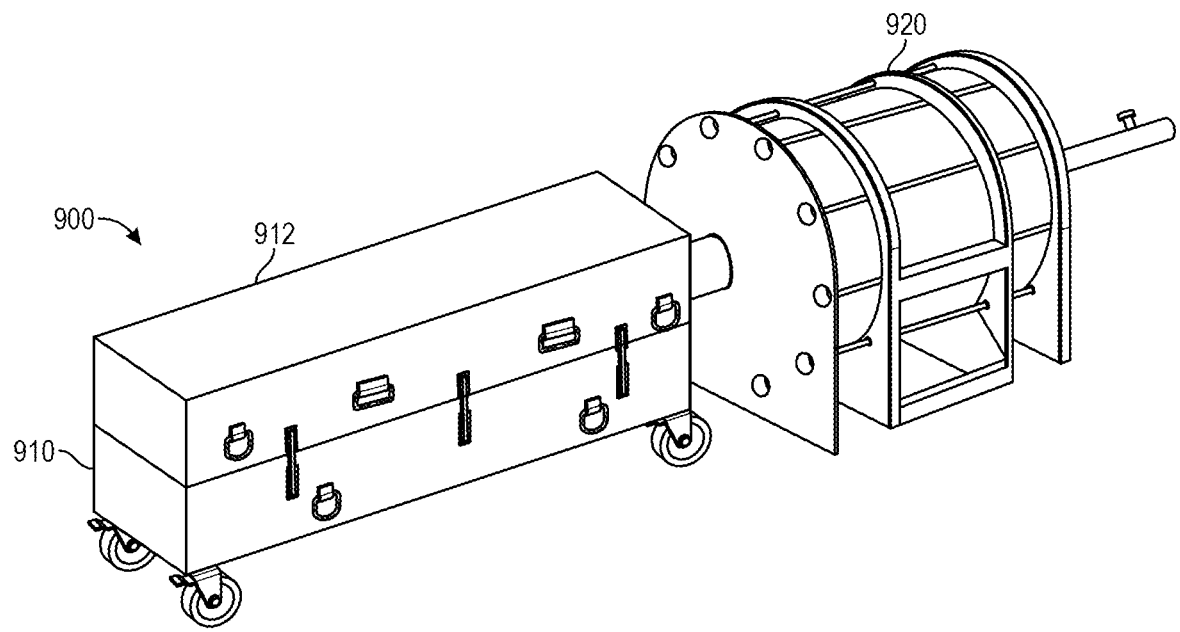
FIGS. 9A and 9B illustrate perspective views of a large format-fractional thermal runaway calorimeter (L-FTRC), according to an embodiment.
Figure 9B:
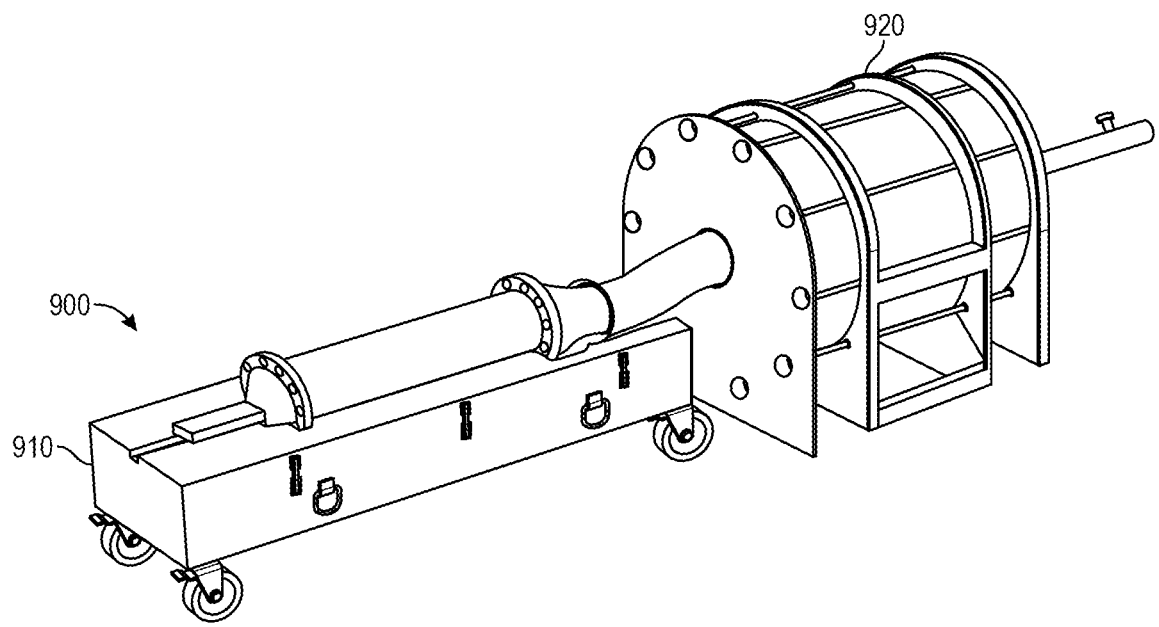

FIGS. 9A and 9B illustrate perspective views of a large format-fractional thermal runaway calorimeter (L-FTRC) 900, according to an embodiment. The L-FTRC 900 includes a housing 910. The L-FTRC 900 may also include a gas collection system 920. FIG. 9A shows the housing 910 with a lid 912 attached, and FIG. 9B shows the housing 910 with the lid 912 removed (e.g., to show internal components). The housing 910 may be insulated. For example, the housing 910 includes form-fitting insulation to encapsulate a cell chamber and ejecta bore (described below), which may reduce heat loss from the L-FTRC 900.

As described in greater detail below, a large format battery (e.g., lithium-ion) cell is placed within the housing 910 and triggered into a thermal runaway event. The L-FTRC 900 may be configured to capture and quantify energy released during the thermal runaway event and to allow separate quantification of the fraction of the thermal runaway energy that: 1) conducts through the cell casing, 2) is carried away by the ejected electrode winding, 3) is contained in both liquid and gaseous effluents captured by the system, 4) remains in the exhaust gases after passing through the main calorimeter body, or a combination thereof.

Figure 10A:
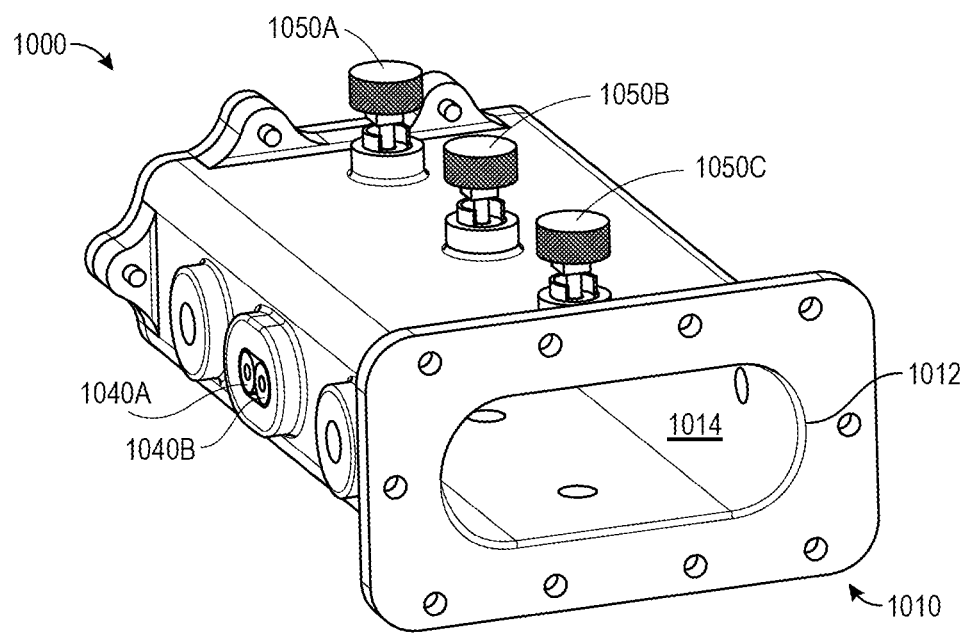
FIG. 10A-10C illustrate perspective views of a cell chamber, according to an embodiment.
Figure 10B:
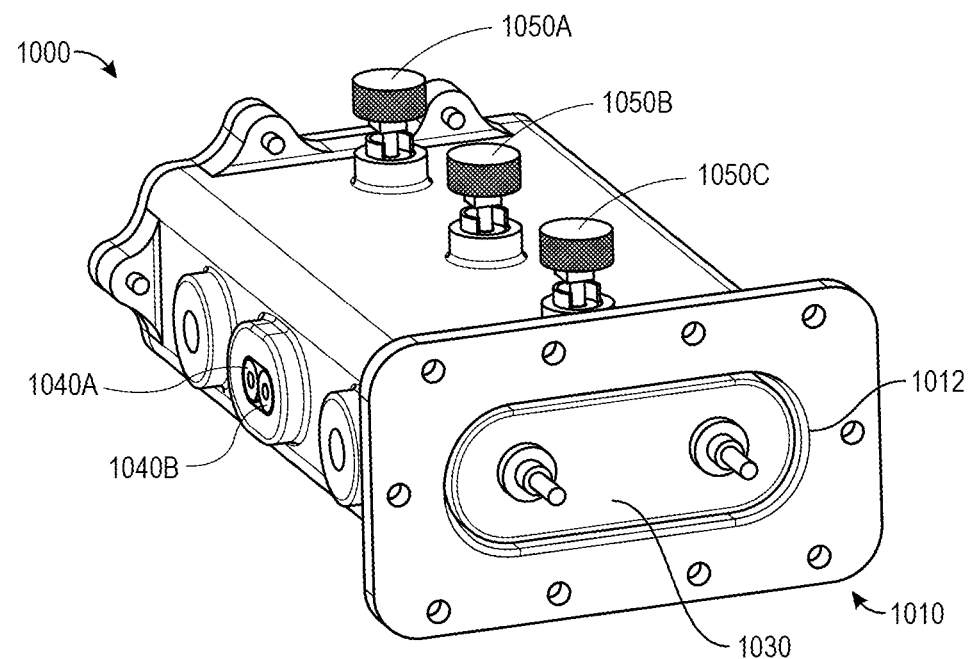
Figure 10C:
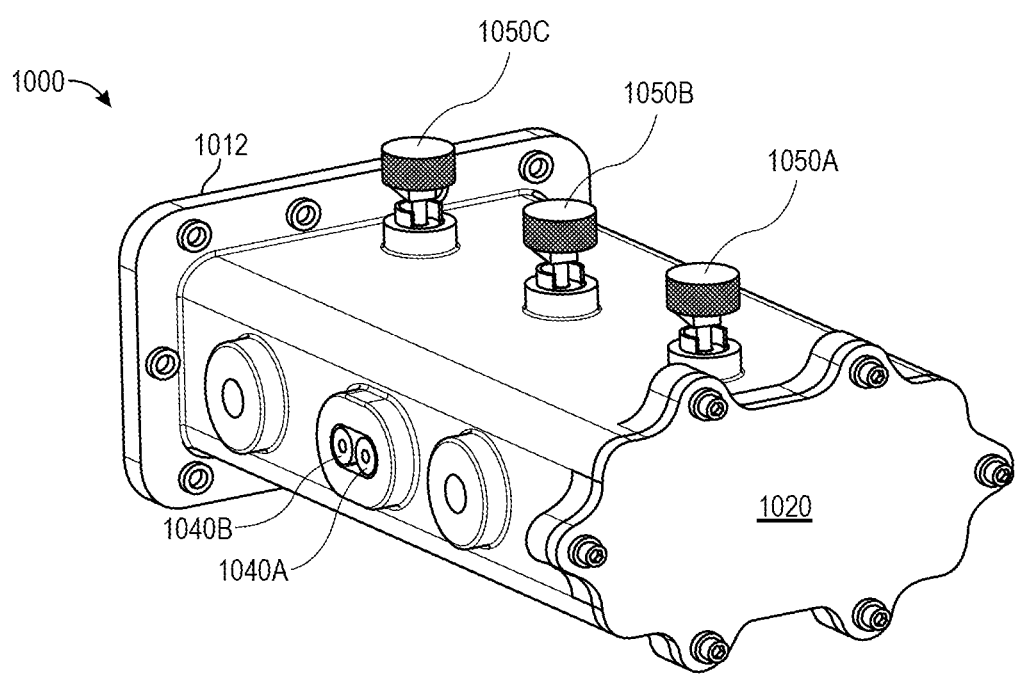

FIGS. 10A-10C illustrate perspective views of a cell chamber 1000, according to an embodiment. The cell chamber 1000 may be configured to be positioned at least partially within (e.g., entirely within) the housing 910. The cell chamber 1000 may be configured to have the large format lithium-ion cell positioned at least partially therein (e.g., entirely therein). The cell chamber 1000 provides heat transfer during the thermal runaway event for calorimetric measurement and calculation. The cell chamber 1000 may be used to determine the fraction of thermal runaway energy released through the casing of the battery cell.

More particularly, FIG. 10A illustrates a perspective view of a first (e.g., open) end 1010 of the cell chamber 1000. The open end 1010 may include an opening 1012 that leads to a bore 1014 that extends at least partially through the cell chamber 1000. FIG. 10B illustrates a perspective view of the first (e.g., open) end 1010 of the cell chamber 1000 with a battery cell 1030 positioned at least partially within (e.g., entirely within) the cell chamber 1000. For example, the battery cell 1030 may be positioned at least partially within the bore 1014. The battery cell 1030 may be or include a large-format lithium-ion cell. FIG. 10C illustrates a perspective view of a second (e.g., closed) end 1020 of the cell chamber 1000. As shown, the bore 1014 does not extend through the closed end 1020.

The cell chamber 1000 may also include one or more nail holes (two are shown: 1040A, 1040B) that are configured to receive nails from a pneumatically-controlled nail penetration system, which may penetrate the battery cell 1030 and trigger a thermal runaway event. The cell chamber 1000 may provide a physical structure that prevents the side walls of the battery cell 1030 from rupturing during the thermal runaway event. The cell chamber 1000 may also include one or more sensors (three are shown: 1050A-1050C) that are configured to measure the temperature of the battery cell 1030 during thermal runaway testing. More particularly, the sensors (e.g., thermocouples) 1050A-1050C are configured to measure the temperature and/or heat energy that is transmitted through the casing of the battery cell 1030 during the thermal runaway event.

Figure 11A:
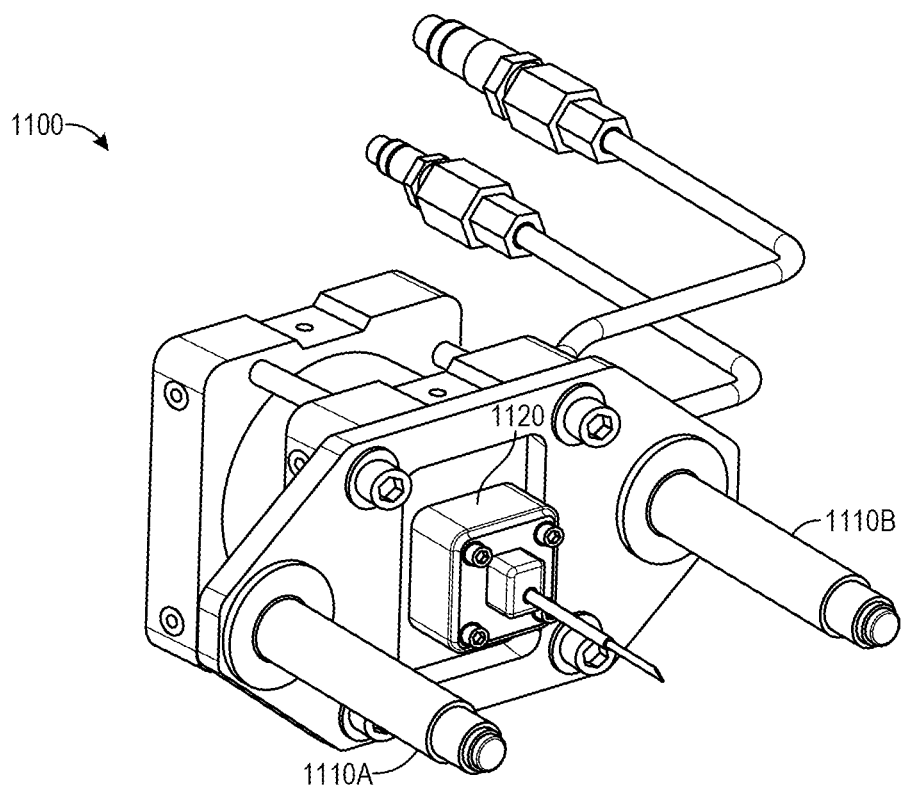
FIGS. 11A and 11B illustrate perspective views of a pneumatically-controlled nail penetration system, according to an embodiment.
Figure 11B:
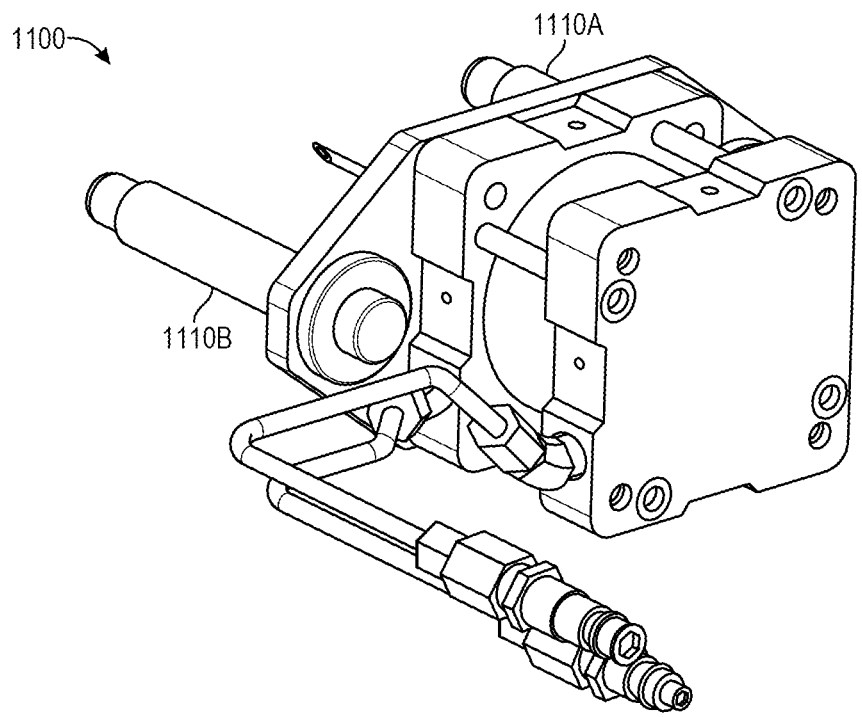

FIGS. 11A and 11B illustrate perspective views of a pneumatically-controlled nail penetration system 1100, according to an embodiment. The system 1100 may include one or more connectors (two are shown: 1110A, 1110B) that are configured to connect the nail penetration system 1100 to the side of the cell chamber 1000. The system 1100 may also include a pneumatic actuator 1120 that is configured to actuate from a retracted position to an extended position (e.g., through one or both of the nail holes 1040A, 1040B of the cell chamber 1000). The actuation may penetrate the battery cell 1030 to trigger the thermal runaway event in a controlled manner that is consistent for each test/experiment.

Figure 12:
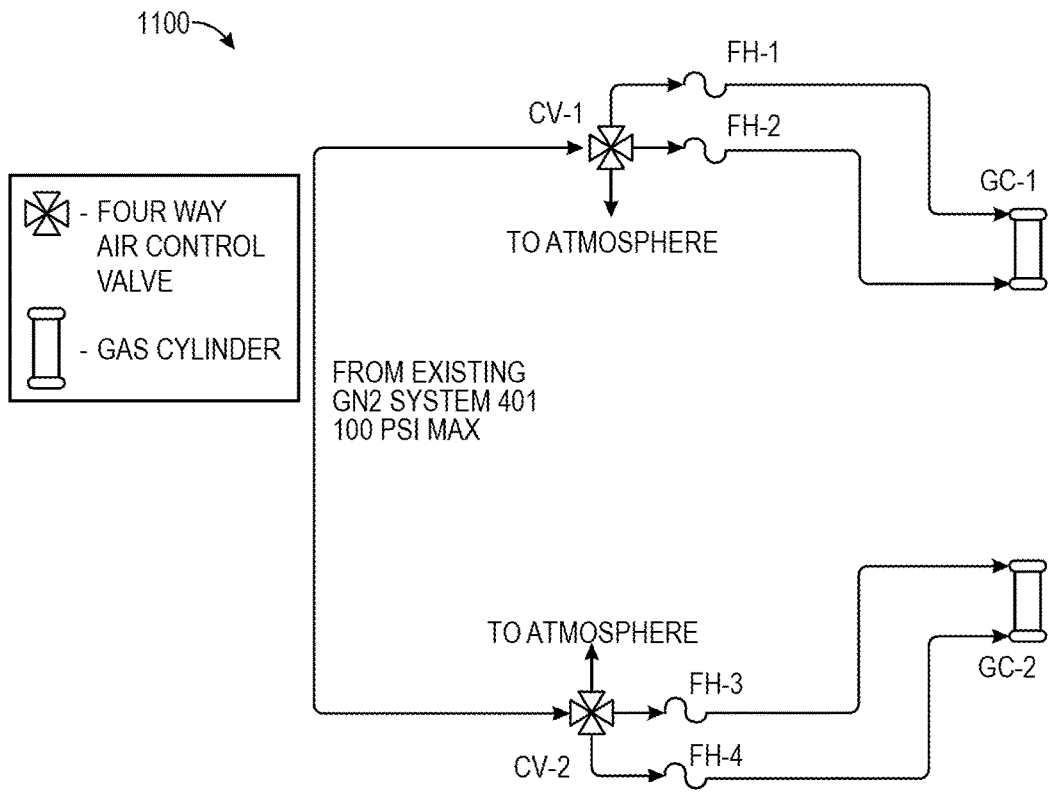
FIG. 12 illustrates a schematic view of the nail penetration system, according to an embodiment.

FIG. 12 illustrates a schematic view of the nail penetration system 1100, according to an embodiment. In FIG. 12, gaseous nitrogen may be routed through two control valves (CV-1 and CV-2) and to two gas cylinders (GC-1 and GC-2) to insert the nail penetrators into the battery cell 1030. The control valves then adjust, removing the penetrators from the battery cell 1030.

Figure 13A:
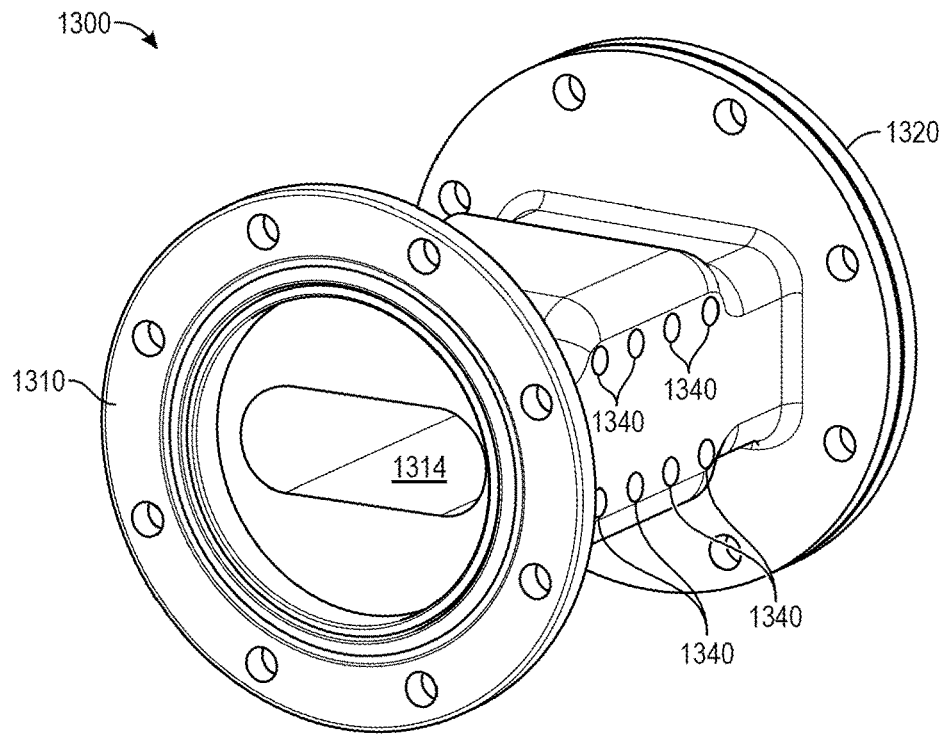
FIGS. 13A and 13B illustrate perspective views of another cell chamber, according to an embodiment.
Figure 13B:
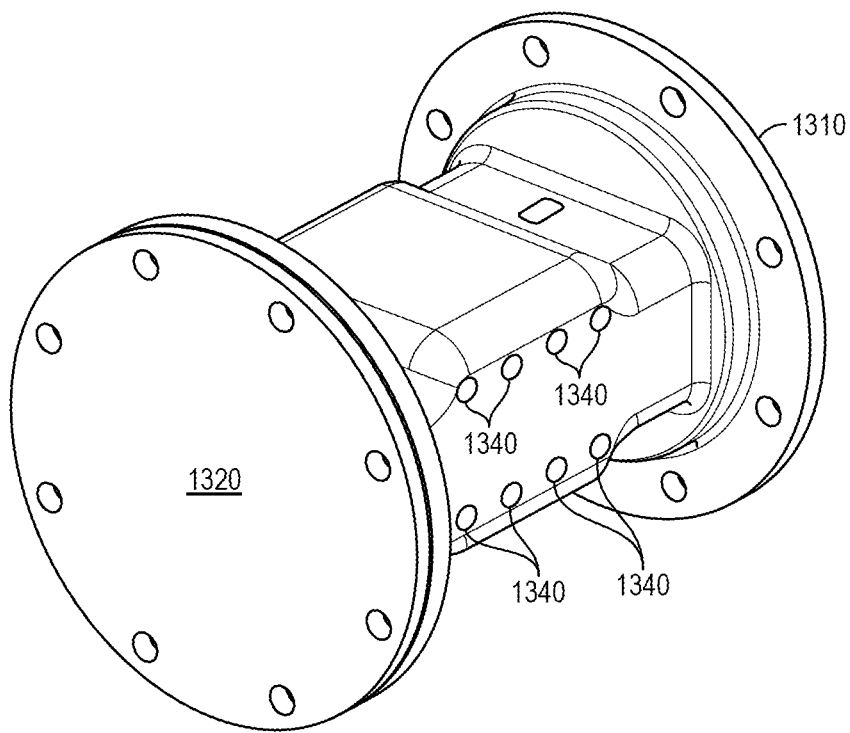

FIGS. 13A and 13B illustrate perspective views of another cell chamber 1300, according to an embodiment. The cell chamber 1300 may be similar to the cell chamber 1000. For example, the cell chamber 1300 may include an open end 1310, a bore 1314, and a closed end 1320. However, instead of nail holes, the cell chamber 1300 may instead include heater holes 1340. The heater holes 1340 may be configured to receive heater cartridges that increase the temperature of the battery cell 1030 and trigger a thermal runaway event in a controlled manner that is consistent for each test/experiment. The cell chamber 1300 may provide a physical structure that prevents the side walls of the battery cell 1030 from rupturing during the thermal runaway event. In addition to triggering the thermal runaway event via nails and/or heater cartridges, the thermal runaway event may also or instead be triggered through magnetic induction, laser, etc.

Figure 14:
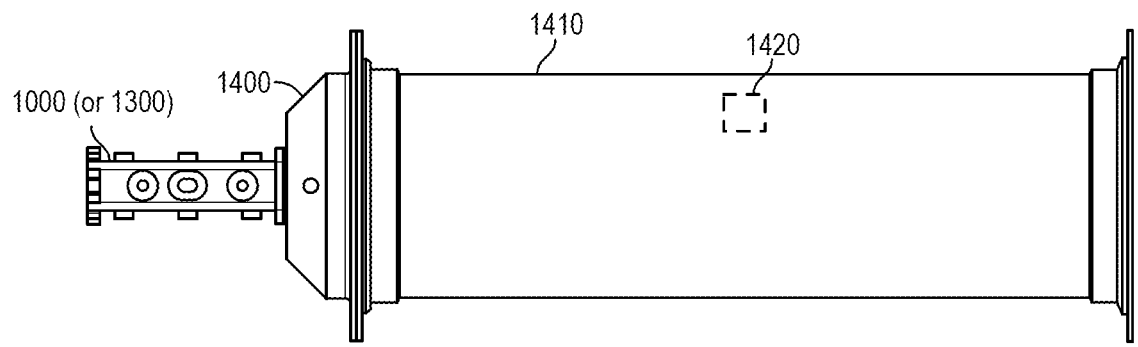
FIG. 14 illustrates a side view of an expansion chamber and an ejecta bore (muffler), according to an embodiment.

FIG. 14 illustrates a side view of an expansion chamber 1400 and an ejecta bore (muffler) 1410, according to an embodiment. The expansion chamber 1400 and ejecta bore muffler 1410 may be positioned at least partially within (e.g., entirely within) the housing 910 in FIG. 9 so that heat loss may be minimized due to the insulation in the housing 910. The expansion chamber 1400 may be coupled to and/or positioned between the cell chamber 1000 (or 1300) and the ejecta bore muffler 1410. The expansion chamber 1400 may be configured to provide an expansion volume from a first (e.g., smaller) opening of the cell chamber 1000 (or 1300) downstream to a second (e.g., larger) opening of the ejecta bore muffler 1410. Thus, the diameter (and/or cross-sectional area) of the expansion chamber 1400 increases proceeding in a direction from left to right as shown in FIG. 14.

The ejecta bore muffler 1410 may be configured to contain the ejecta materials from the battery cell 1030 during the thermal runaway event. In addition, the ejecta bore muffler 1410 may include one or more sensors (e.g., temperatures sensors 1420) that are configured to measure the temperature and/or heat energy in the ejecta bore muffler 1410 during the thermal runaway event, which may be used by an energy yield algorithm (EYA) to determine the fraction of the thermal runaway energy that is ejected from the battery cell 1030 in the form of hot solids, liquids, and gases.

Figure 15:
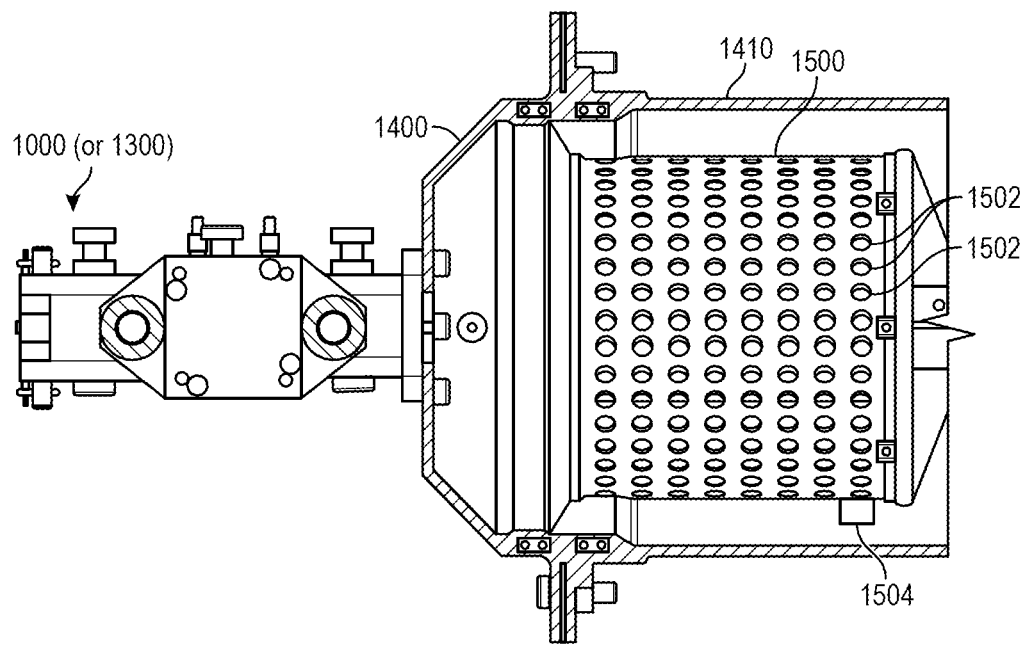
FIG. 15 illustrates a side view of an ejecta basket, according to an embodiment.

FIG. 15 illustrates a side view of an ejecta basket 1500, according to an embodiment. The ejecta basket 1500 may be positioned at least partially within (e.g., entirely within) the ejecta bore muffler 1410. The ejecta basket 1500 may be at least partially hollow (e.g., with a bore formed therethrough). The ejecta basket 1500 may include one or more radial openings 1502. A plurality of openings 1502 are shown that are axially-offset and/or circumferentially-offset from one another.

When the battery cell 1030 experiences the thermal runaway event, the ejecta basket 1500 may be configured to capture the ejected electrode winding from the battery cell 1030 in a way that permits natural expansion of the electrode winding while maintaining the electrode winding in a fixed location as may occur in a field failure. The ejecta basket 1500 may include one or more sensors (e.g., temperatures sensors 1504) that are configured to measure the temperature and/or heat energy of the electrode winding in the ejecta basket 1500. The measurement may then be used to determine the fraction of the thermal runaway energy contained within the ejected electrode. The ejecta basket 1500 may allow the expelled gases and effluents from the thermal runaway event to pass therethrough (e.g., through the openings 1502).

Figure 16A:
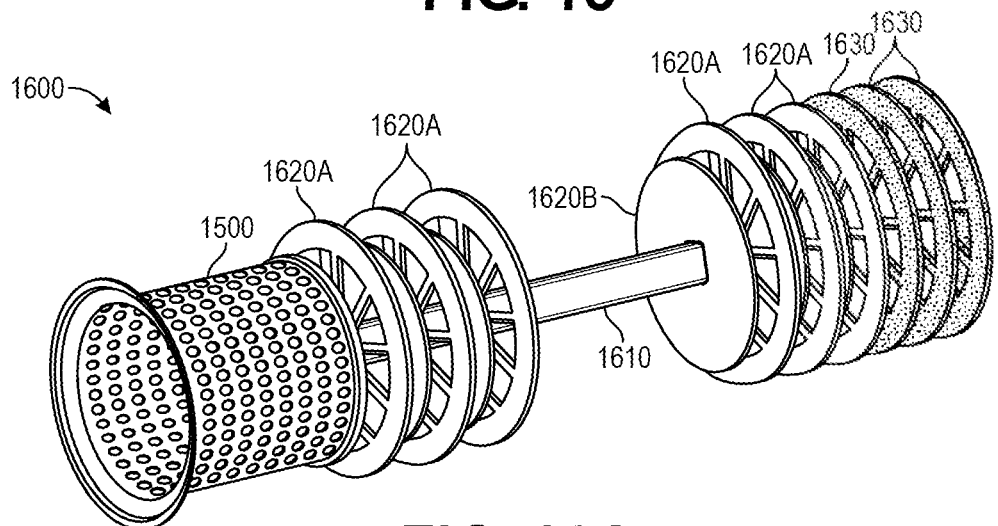
FIG. 16A illustrates a perspective view of an internal sub-assembly of the ejecta bore muffler, according to an embodiment.

FIG. 16A illustrates a perspective view of an internal sub-assembly 1600 of the ejecta bore muffler 1410, according to an embodiment. During the thermal runaway event, the internal sub-assembly 1600 may be configured to slow the flow of ejected gases and/or stop the flow of ejected particulates (e.g., soot). The temperature and/or heat energy of the gases and particulates may then be measured and used to determine the fraction of thermal runaway energy that is ejected from the battery cell 1030.

The internal sub-assembly 1600 may be positioned at least partially within (e.g., entirely within) the ejecta bore muffler 1410. The internal sub-assembly 1600 may include the ejecta basket 1500, a central rod 1610, one or more baffles 1620A, 1620B, and a mesh 1630. The rod 1610 may extend at least partially through the baffles 1620A, 1620B and/or the mesh 1630. The baffles 1620A, 1620B may be axially-offset from one another along the rod 1610. The mesh 1630 may be positioned at least partially around the rod 1610 and/or the baffles 1620A, 1620B. The mesh 1630 may be made of copper. As mentioned above, the baffles 1620A, 1620B and/or the mesh 1630 may be configured to slow the flow of ejected gases and/or stop the flow of ejected particulates (e.g., soot). The baffles 1620A, 1620B may have different diameters to create a tortuous flow path therethrough and/or therearound.

Figure 16B:
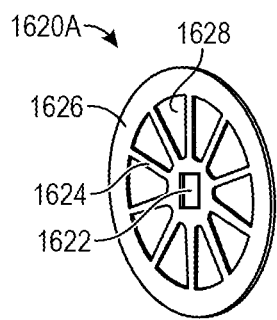
FIG. 16B illustrates a perspective view of a first baffle of the internal sub-assembly, according to an embodiment.

FIG. 16B illustrates a perspective view of one of the baffles 1620A, according to an embodiment. As may be seen, the baffle 1620A may have a central opening 1622 through which the rod 1610 may extend. The baffle 1620A may also include a plurality of radial spokes 1624 that extend radially-outward from the central opening 1622 toward an outer rim 1626. A plurality of windows 1628 may be positioned circumferentially-between adjacent spokes 1624. In at least one embodiment, the baffles 1620A may be circumferentially-offset with one another such that there is no direct line of sight through the windows 1628 from one axial end of the ejecta bore muffler 1410 to the other axial end of the ejecta bore muffler 1410. As a result, the particles ejected from the battery cell 1030 may contact the spokes 1624 and be prevented from exiting the ejecta bore muffler 1410 and/or the ejecta basket 1500, while the gases may be able to pass through the windows 1628 and exit the ejecta bore muffler 1410 and/or the ejecta basket 1500.

Figure 16C:
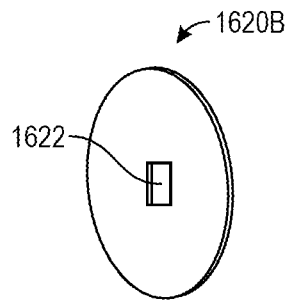
FIG. 16C illustrates a perspective view of a second baffle of the internal sub-assembly, according to an embodiment.

FIG. 16C illustrates a perspective view of one of the baffles 1620B, according to an embodiment. The baffle 1620B may include the central opening 1622, but may not include the spokes 1624 and/or the windows 1628. The baffle 1620B may be positioned between two of the baffles 1620A. The particles ejected from the battery cell 1030 may contact the baffle 1620B and be prevented from exiting the ejecta bore muffler 1410 and/or the ejecta basket 1500, while the gases may be able to exit the ejecta bore muffler 1410 and/or the ejecta basket 1500.

Figure 17:
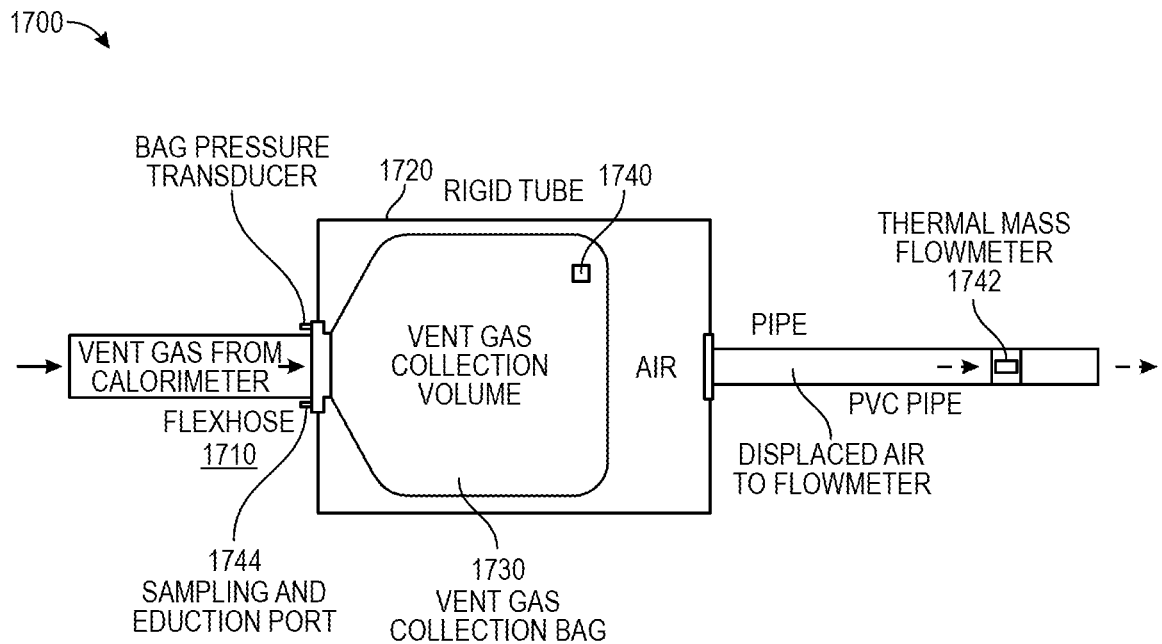
FIG. 17 illustrates a cross-sectional side view of a gas collection system, according to an embodiment.

FIG. 17 illustrates a schematic view of a gas collection system 1700, according to an embodiment. The gas collection system 1700 may be similar to the gas collection system 920 in FIGS. 9A and 9B. The gas collection system 1700 may be positioned downstream from the housing 910, the cell chamber 1000 (or 1300), expansion chamber 1400, the ejecta bore muffler 1410, the ejecta basket 1500, or a combination thereof. For example, the gas collection system 1700 may be coupled to the ejecta bore muffler 1410 via a flexible hose 1710.

The gas collection system 1700 may include a large rigid cylindrical container 1720. A non-porous vent gas collection bag 1730 may be positioned at least partially within (e.g., entirely within) the container 1720. Prior to thermal runaway testing, the gas collection system 1700 may be purged with inert gas (e.g., argon) to limit contamination or dilution of the sample by residual atmosphere in the calorimeter body. During thermal runaway testing, the container 1720 (e.g., the bag 1730) may be configured to receive and fill with thermal runaway exhaust gases from the ejecta bore muffler 1410.

The gas collection system 1700 may include three or more sensors (three are shown: 1740, 1742, 1744). A first sensor 1740 may be or include a temperature sensor that is configured to measure the temperature and/or heat energy of the exhaust gas that is expelled from the battery cell 1030 during the thermal runaway event. A second sensor 1742 may be or include a volume sensor that is configured to measure a volume of the exhaust gas in the gas collection system 1700 (e.g., via displacement of air in the gas collection system 1700 as the vent gas collection bag 1730 fills with thermal runaway vent gases). The third sensor 1744 may be or include a composition sensor that is configured to measure the composition of the exhaust gas (e.g., in situ) in the gas collection system 1700.

Figure 18:
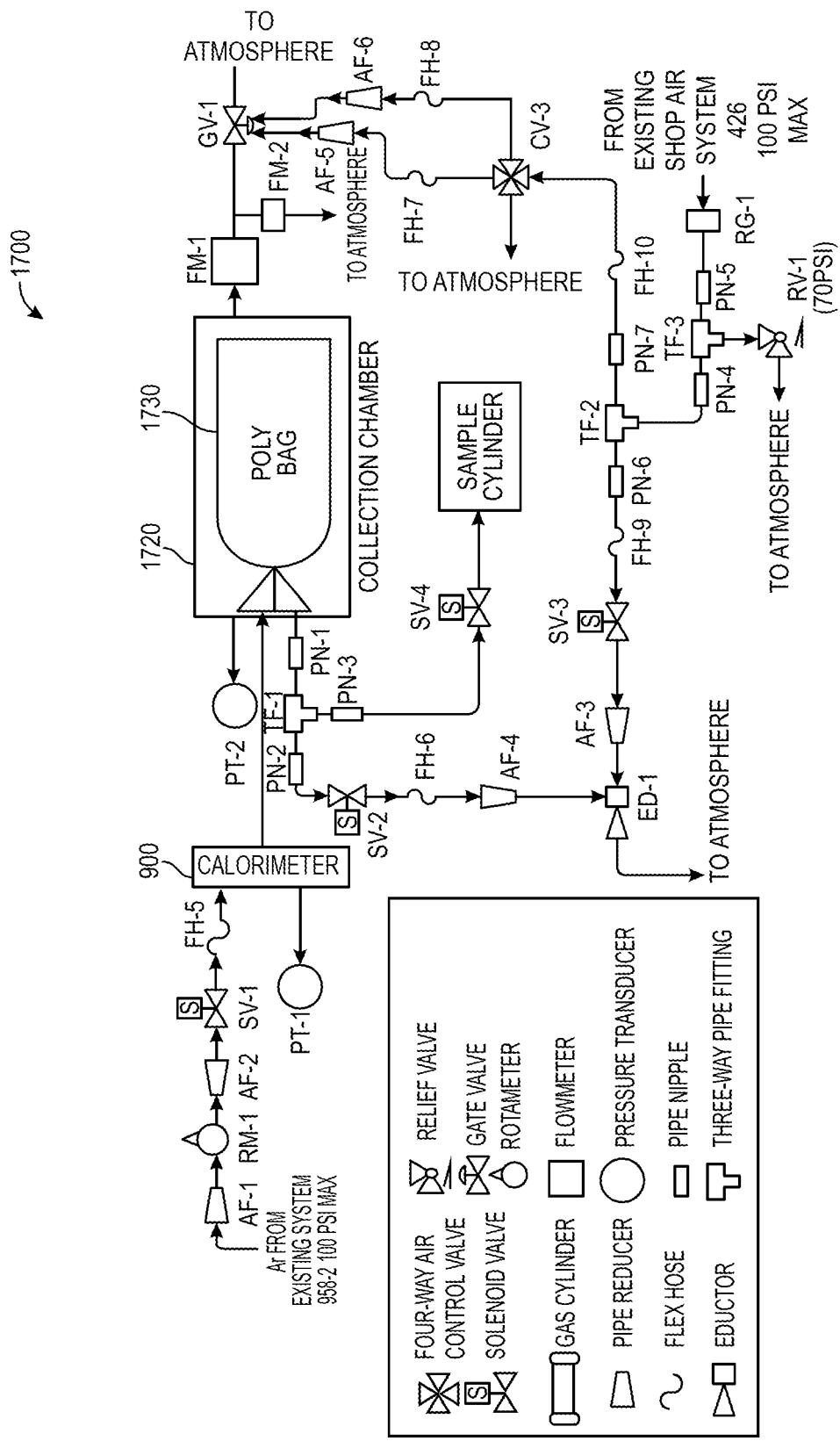
FIG. 18 illustrates a schematic view of the gas collection system, according to an embodiment.

FIG. 18 illustrates a schematic view of the gas collection system 1700, according to an embodiment. Gas released from the calorimeter 900 enters the polybag 1730, displacing air inside the gas collection system 1700 and driving it past a flowmeter FM-1, FM-2 to calculate the volume displaced. When the experiment is complete, the pneumatic valve SV-4 is opened to align the volume of captured gas with a sample bottle to collect an amount for composition testing. When the valve SV-4 is closed, the valves SV-2 and SV-3 are opened to start the eductor ED-1, which removes the remaining gas in the system. The valve SV-1 is opened to initiate the flow of argon through the calorimeter 900 to purge the system.

Figure 19A:
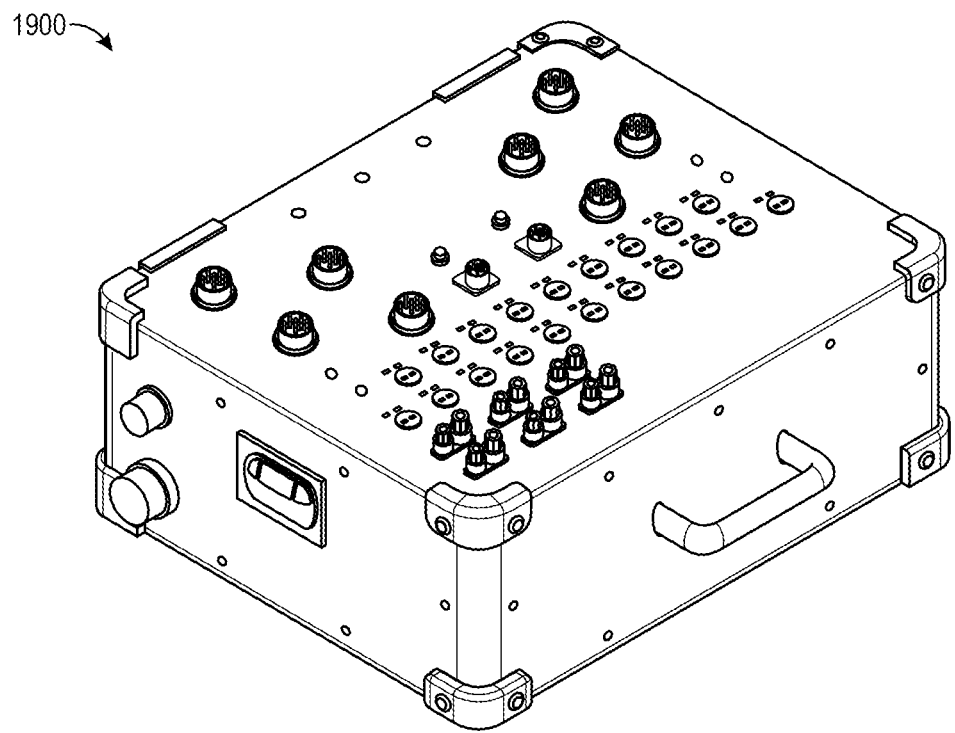
FIGS. 19A and 19B illustrate a perspective view and a side view, respectively, of a universal data acquisition (un-iDAQ) system, according to an embodiment.
Figure 19B:
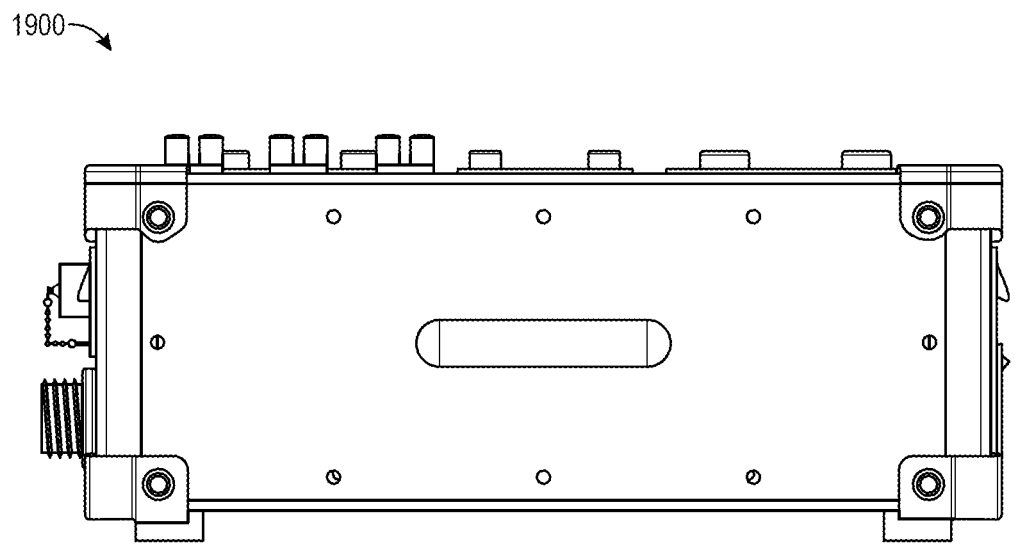

FIGS. 19A and 19B illustrate a perspective view and a side view, respectively, of a computing system 1900, according to an embodiment. The computing system 1900 may be or include a universal data acquisition (uniDAQ) system. The uniDAQ system 1900 may be configured to receive and process data from a plurality of sensors. A few of the sensors are described below for illustrative purposes; however, it will be appreciated that this description is not an exhaustive list, and the uniDAQ system 1900 may receive and process data from other sensors.

The uniDAQ system 1900 may be configured to measure/receive the temperature and/or heat energy from the sensors 1050A-1050C in/on the cell chamber 1000 (or 1300), which may be used to determine the fraction of thermal runaway energy released through the casing of the battery cell 1030. The uniDAQ system 1900 may also be configured to measure/receive the temperature and/or heat energy from the sensor 1420 in/on the ejecta bore muffler 1410, which may be used to determine the fraction of the thermal runaway energy that is ejected from the battery cell 1030 in the form of hot particulates and/or gases. The uniDAQ system 1900 may also be configured to measure/receive the temperature and/or heat energy from the sensor 1504 in/on the ejecta basket 1500, which may be used to determine the fraction of the thermal runaway energy that is contained within the ejected electrode winding. The uniDAQ system 1900 may also be configured to measure/receive the temperature and/or heat energy from the sensor 1740 in/on the gas collection system 1700, which may be used to determine the fraction of the thermal runaway energy that is ejected from the battery cell 1030 in the form of hot particulates and/or gases. The uniDAQ 1900 may also be configured to measure/receive voltage inputs from sensors used to characterize nail penetration actuation via depth sensor. The uniDAQ 1900 may also be configured to measure/receive voltage inputs from sensors used to characterize system pressure change via pressure transducer. The uniDAQ 1900 may also be configured to measure/receive voltage inputs from sensors used to characterize cartridge heater voltage and current. The uniDAQ 1900 may also be configured to measure/receive voltage inputs from sensors used to characterize gas flow rate.

The uniDAQ system 1900 may also be configured to measure/determine the gas flow rate (e.g., volumetric flow rate) through the expansion chamber 1400, the ejecta bore muffler 1410, the gas collection system 1700, or a combination thereof (e.g., from the sensor 1742).

The uniDAQ system 1900 may also be configured to measure/determine the open circuit voltage of the battery cell 1030. The uniDAQ system 1900 may also be configured to measure/determine the pressure in the expansion chamber 1400, the pressure in the ejecta bore muffler 1410, the pressure in the gas collection system 1700, or a combination thereof. The uniDAQ system 1900 may also measure/receive the depth that the nail penetration system 1100 penetrates into the battery cell 1030.

The data may then be used for subsequent processing by one or more energy yield algorithms (EYAs). The EYA may be used to post-process test data to determine the thermal runaway energy yield and the fractions of the thermal runaway energy conducting through the casing of the battery cell 1030, carried by the electrode winding of the battery cell 1030, and vented as gases and/or effluents. In one embodiment, the test parameters may be transmitted through instrumentation wiring and cabling, which may be protected from damage using strain relief devices. The strain relief devices may be or include connectors through which one or more cables may extend, and the connectors may limit the amount by which the cables bend.

FIG. 20 illustrates a perspective view of a calibration heater system 2000, according to an embodiment. The system 2000 may include cartridge heaters 2010, laminated heaters 2020, cartridge heaters 2030, or a combination thereof. The heaters 2010, 2020, 2030 may simulate heat generation from a large format lithium-ion cell entering thermal runaway. The system 2000 may be configured to generate 1.8 MJ (or more) of heat energy in less than three minutes.

Figure 21:
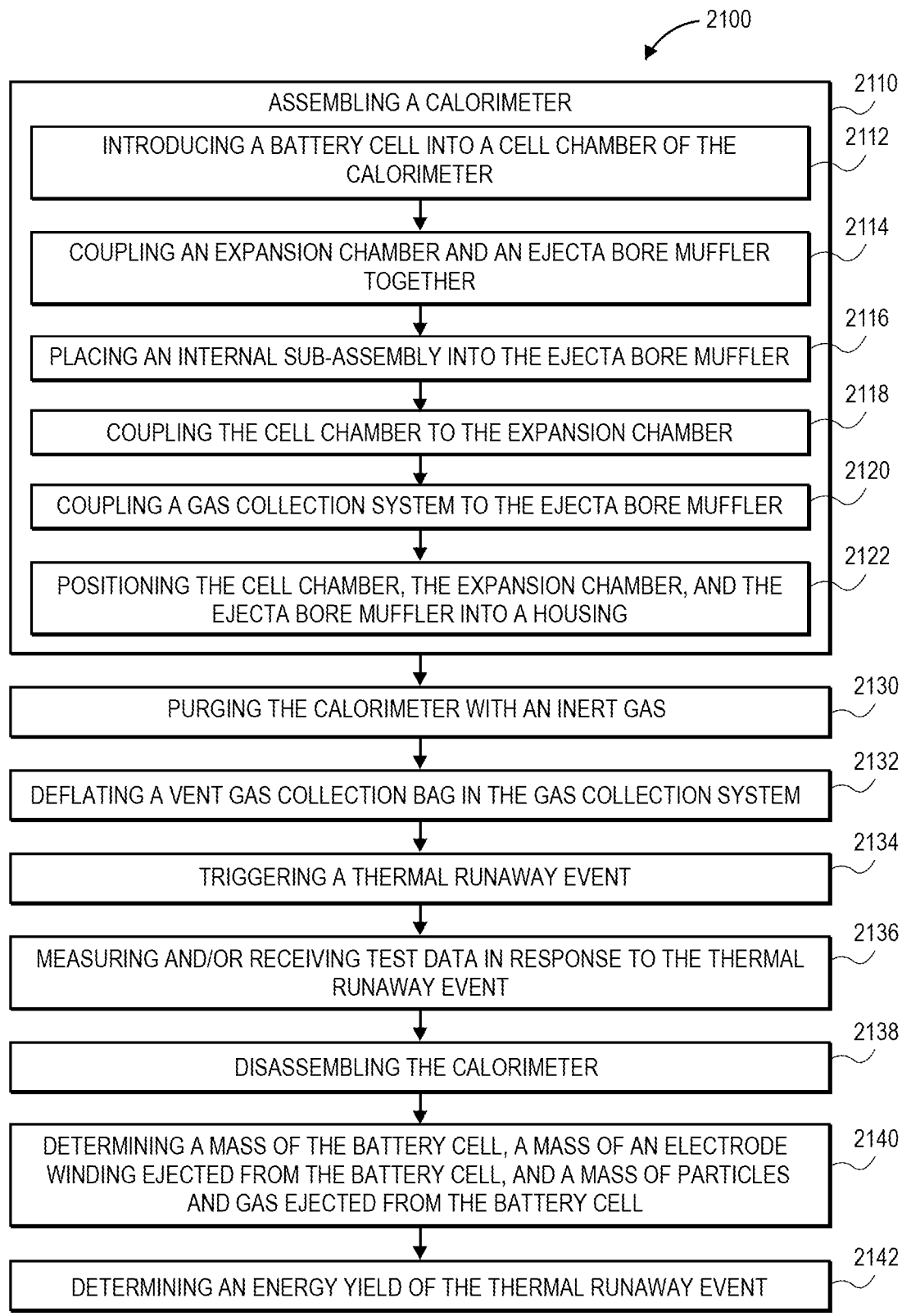
FIG. 21 illustrates a flowchart of a method for measuring heat response of a battery cell (e.g., a large-format lithium-ion cell) during a thermal runaway event, according to an embodiment.

FIG. 21 illustrates a flowchart of a method 2100 for measuring a heat response of the battery cell (e.g., a large-format lithium-ion cell) 1030 during a thermal runaway event, according to an embodiment. An illustrative order of the method 2100 is provided below; however, one or more steps of the method 2100 may be performed in a different order, performed simultaneously, repeated, or omitted.

The method 2100 may include assembling the calorimeter (e.g., the L-FTRC) 900, as at 2110. Assembling the calorimeter 900 may include introducing the battery cell 1030 into the cell chamber 1000 (or 1300), as at 2112. Assembling the calorimeter 900 may also include coupling the expansion chamber 1400 and ejecta bore muffler 1410 together, as at 2114. Assembling the calorimeter 900 may also include placing (e.g., sliding) the internal sub-assembly 1600 into the ejecta bore muffler 1410, as at 2116. The internal sub-assembly 1600 may be or include the ejecta basket 1500, the central rod 1610, the baffles 1620, the mesh 1630, or a combination thereof. The internal sub-assembly may be secured (e.g., bolted) in place by a cap. Assembling the calorimeter 900 may also include coupling the cell chamber 1000 (or 1300) to the expansion chamber 1400, as at 2118. Assembling the calorimeter 900 may also include coupling the gas collection system 1700 to the ejecta bore muffler 1410 (e.g., via the flexible hose 1710), as at 2120. Assembling the calorimeter 900 may also include positioning the cell chamber 1000 (or 1300), the expansion chamber 1400, and the ejecta bore muffler 1410 (and its internal sub-assembly) into the housing 910, as at 2122.

Once the calorimeter 900 has been assembled, the method 2100 may also include purging the calorimeter 900 with an inert gas, as at 2130. This may include purging the expansion chamber 1400, the ejecta bore muffler 1410, the ejecta basket 1500, the gas collection system 1700, or a combination thereof with the inert gas. In one example, the inert gas may be or include argon. The method 2100 may also include at least partially deflating the vent gas collection bag 1730, as at 2132. The gas may be removed from the vent gas collection bag 1730 using an eductor.

The method 2100 may also include triggering a thermal runaway event, as at 2134. In one embodiment, the thermal runaway event may be triggered by penetrating the casing of the battery cell 1030 using the nail penetration system 1100. In another embodiment, the thermal runaway event may be triggered by heating the battery cell 1030 with the heater cartridges. As mentioned above, as part of the thermal runaway event, the electrode winding, hot particulates, and gas may be ejected from the battery cell 1030 and travel through the expansion chamber 1400 into the ejecta bore muffler 1410. The electrode winding may be captured within the ejecta basket in the ejecta bore muffler 1410. At least a portion of the hot particles may contact the internal assembly 1600 and remain within the ejecta bore muffler 1410. At least a portion of the gas may exit the ejecta bore muffler 1410 and flow into the gas collection system 1700.

The method 2100 may also include measuring and/or receiving test data in response to the thermal runaway event, as at 2136. As mentioned above, the test data may be measured by one or more of the sensors (e.g., sensors 1050A-1050C, 1420, 1504, 1740, 1742, 1744) and received by the uniDAQ system 1900 from the sensors. The test data may include the temperature and/or heat energy from the sensor 1050A-1050C in/on the cell chamber 1000 (or 1300), which may be used to determine the fraction of thermal runaway energy released through the casing of the battery cell 1030. The test data may also include the temperature and/or heat energy from the sensor 1420 in/on the ejecta bore muffler 1410, which may be used to determine the fraction of the thermal runaway energy that is ejected from the battery cell 1030 in the form of hot particulates and gases. The test data may also include the temperature and/or heat energy from the sensor 1504 in/on the ejecta basket 1500, which may be used to determine the fraction of the thermal runaway energy that is contained within the ejected electrode winding. The test data may also include the temperature and/or heat energy from the sensor 1740 in/on the gas collection system 1700, which may be used to determine the fraction of the thermal runaway energy that is ejected from the battery cell 1030 in the form of hot particulates and gases. The test data may also include the volume (from sensor 1742) and/or composition (from sensor 1744) of the exhaust gas in the gas collection system 1700. As mentioned above, additional sensors may also be used to provide additional test data.

The method 2100 may also include disassembling the calorimeter 900, as at 2138. The method 2100 may also include determining a mass of the battery cell 1030 (e.g., the carcass of the cell), a mass of the electrode winding, a mass of the hot particles (e.g., soot) and/or gas, or a combination thereof, as at 2140. The method 2100 may also include determining an energy yield of the thermal runaway event, as at 2142. The energy yield may be determined by the EYA based at least partially upon the test data and/or the mass. The energy yield may include (1) the total thermal runaway energy yield, (2) the fraction of the thermal runaway energy yield conducted through the casing of the battery cell 1030, (3) the fraction of the thermal runaway energy yield carried by the electrode winding of the battery cell 1030, (4) the fraction of the thermal runaway energy yield vented as particles and/or gases, or a combination thereof. The fractions may add up to the total thermal runaway energy yield. As mentioned, the energy yield(s) may provide insight into parameters relevant to battery design (e.g., to improve the design of the battery cell 1030 by reducing the likelihood or magnitude of thermal runaway events).

In light of the principles and exemplary embodiments described and illustrated herein, it will be recognized that the exemplary embodiments can be modified in arrangement and detail without departing from such principles. Also, the foregoing discussion has focused on particular embodiments, but other configurations are contemplated. In particular, even though expressions such as "in one embodiment," "in another embodiment," "in a version of the embodiment" or the like are used herein, these phrases are meant to generally reference the range of possibilities of embodiments, and are not intended to limit the disclosure to the particular embodiments and configurations described herein. As used herein, these terms may reference the same or different embodiments that are combinable into other embodiments.

Similarly, although exemplary processes have been described with regard to particular operations performed in a particular sequence, numerous modifications could be applied to those processes to derive numerous alternative embodiments of the present disclosure. For example, alternative embodiments may include processes that use fewer than all of the disclosed operations, processes that use additional operations, and processes in which the individual operations disclosed herein are combined, subdivided, rearranged, differently ordered or otherwise altered.

In view of the wide variety of useful permutations that may be readily derived from the exemplary embodiments described herein, this detailed description is intended to be illustrative only, and should not be taken as limiting the scope of the disclosure.

What is claimed is:

1. A system for measuring a heat response of a battery cell, the system comprising:
    a cell chamber configured to receive the battery cell therein, wherein the cell chamber is configured to trigger the battery cell into a thermal runaway event while in the cell chamber, which causes the battery cell to eject an electrode winding, particles, and gas;
    an ejecta bore muffler configured to receive the electrode winding, particles, and gas;
    an ejecta basket configured to be positioned at least partially within the ejecta bore muffler, wherein the ejecta basket is configured to capture the electrode winding while allowing at least a portion of the particles, the gas, or both to pass therethrough;
    a gas collection system configured to receive at least a portion of the gas that passes through the ejecta basket; and
    a computing system configured to determine energy yield data based at least partially upon an amount of heat transferred through a casing of the battery cell, an amount of heat in the electrode winding, an amount of heat in the particles, an amount of heat in the gas, or a combination thereof.

2. The system of claim 1, wherein the battery cell comprises a large-format lithium-ion battery cell having an Ampere-Hour (Ah) capacity that is greater than or equal to about 100 Ah.

3. The system of claim 1, further comprising a housing, wherein the cell chamber, the ejecta bore muffler, and the ejecta basket are positioned at least partially within the housing, and wherein the gas collection system is not positioned within the housing.

4. The system of claim 1, further comprising an expansion chamber configured to be positioned between the cell chamber and the ejecta bore muffler, wherein the electrode winding, the particles, and the gas travel from the cell chamber, through the expansion chamber, and to the ejecta bore muffler, and wherein a cross-sectional area of the expansion chamber increases proceeding away from the cell chamber and toward the ejecta bore muffler.

5. The system of claim 1, further comprising:
    a rod configured to be positioned at least partially within the ejecta bore muffler; and
    one or more baffles configured to be positioned at least partially within the ejecta bore muffler and operationally connected to the rod, wherein the rod extends through the one or more baffles.

6. The system of claim 5, further comprising a mesh configured to be positioned at least partially within the ejecta bore muffler, wherein the mesh is configured to be positioned at least partially around the rod, the one or more baffles, or both.

7. The system of claim 6, wherein the one or more baffles, the mesh, or both are configured to stop at least a portion of the particles within the ejecta bore muffler to prevent the stopped portion of particles from flowing into the gas collection system.

8. The system of claim 1, further comprising:
a first sensor configured to measure the amount of heat transferred through the casing of the battery cell, wherein the first sensor is coupled to the cell casing;
a second sensor configured to measure the amount of heat in the electrode winding, wherein the second sensor is positioned at least partially within the ejecta basket; and
one or more third sensors configured to measure the amount of heat in the particles, the gas, or both, wherein the one or more third sensors are positioned in the ejecta bore muffler, the gas collection system, or both.

9. The system of claim 1, wherein the computing system is also configured to determine the energy yield data based at least partially upon a volume of the gas and a composition of the gas.

10. The system of claim 1, wherein the energy yield data comprises:
a total energy yield from the battery cell during the thermal runaway event;
a first fraction of the total energy yield transferred through the casing;
a second fraction of the total energy yield in the electrode winding; and
a third fraction of the total energy yield in the particles, the gas, or both.

11. A system for measuring a heat response of a large-format lithium-ion battery cell during a thermal runaway event, the system comprising:
a housing;
a cell chamber positioned at least partially within the housing, wherein the cell chamber comprises a bore formed partially therethrough, wherein the bore receives the large-format lithium-ion battery cell therein, and wherein the large-format lithium-ion battery cell is triggered into the thermal runaway event while in the cell chamber, which causes the large-format lithium-ion battery cell to eject an electrode winding, particles, and gas;
an expansion chamber positioned at least partially within the housing, wherein the expansion chamber is coupled to the cell chamber and to receive the electrode winding, the particles, and the gas therefrom, and wherein a cross-sectional area of the expansion chamber increases in a direction proceeding away from the cell chamber;
an ejecta bore muffler positioned at least partially within the housing, wherein the ejecta bore muffler is coupled to the expansion chamber;
an ejecta basket positioned at least partially within the ejecta bore muffler, wherein the ejecta basket captures the electrode winding while allowing the particles and the gas to pass therethrough;
a rod positioned at least partially within the ejecta bore muffler;
one or more baffles positioned at least partially within the ejecta bore muffler, wherein the rod extends through the one or more baffles;
a mesh positioned at least partially within the ejecta bore muffler, wherein the mesh is positioned at least partially around the rod and the one or more baffles, wherein the one or more baffles, the mesh, or both stop at least a portion of the particles within the ejecta bore muffler;
a gas collection system positioned outside of the housing, wherein the gas collection system receives the gas from the ejecta bore muffler;
a first set of sensors that measures an amount of heat transferred through a casing of the large-format lithium-ion battery cell;
a second set of sensors that measures an amount of heat in the electrode winding;
a third set of sensors that measures an amount of heat in the particles, the gas, or both;
a computing system that receives the amounts of heat from the first, second, and third sets of sensors, and runs an energy yield algorithm to determine energy yield data based at least partially upon the amounts of heat, wherein the energy yield data comprises:
a total energy yield from the large-format lithium-ion battery cell during the thermal runaway event;
a first fraction of the total energy yield transferred through the casing;
a second fraction of the total energy yield in the electrode winding; and
a third fraction of the total energy yield in the particles, the gas, or both.

12. The system of claim 11, wherein the large-format lithium-ion battery cell has an Ampere-Hour (Ah) capacity that is greater than or equal to about 100 Ah.

13. The system of claim 11, wherein the one or more baffles and the mesh are downstream from the ejecta basket within the ejecta bore muffler.

14. The system of claim 11, wherein the first set of sensors is coupled to the cell chamber, wherein the second set of sensors is coupled to the ejecta basket, and wherein the third set of sensors is coupled to the ejecta bore muffler.

15. The system of claim 11, further comprising a fourth set of sensors that measures a volume of the gas entering the gas collection system, wherein the computing system also receives the volume from the fourth set of sensors and runs the energy yield algorithm to determine the energy yield data based at least partially upon the volume.

16. A method for measuring a heat response of a battery cell, the method comprising:
introducing a battery cell into a cell chamber;
triggering a thermal runaway event for the battery cell while the battery cell is in the cell chamber, which causes the battery cell to eject an electrode winding, particles, and gas;
measuring an amount of heat transferred through a casing of the battery cell during the thermal runaway event, an amount of heat in the electrode winding, an amount of heat in the particles, an amount of heat in the gas, or a combination thereof; and
determining, using a computing system, energy yield data based at least partially upon the amount of heat transferred through the casing, the amount of heat in the electrode winding, the amount of heat in the particles, the amount of heat in the gas, or the combination thereof.

17. The method of claim 16, wherein the electrode winding, the particles, and the gas travel from the cell chamber into an ejecta bore muffler, wherein an ejecta basket in the ejecta bore muffler is configured to capture the electrode winding while allowing at least a portion of the particles, the gas, or both to pass therethrough, and wherein a gas collection system is configured to receive at least a portion of the gas that passes through the ejecta basket.

18. The method of claim 17, wherein the energy yield data comprises a fraction of a total energy yield that is transferred through the casing.

19. The method of claim 16, wherein the energy yield data comprises a fraction of a total energy yield that is in the electrode winding.

20. The method of claim 16, wherein the energy yield data comprises a fraction of a total energy yield that is in the particles, the gas, or both.

* * * * *